(12) United States Patent
Neelakantan et al.

(10) Patent No.: US 8,960,562 B2
(45) Date of Patent: Feb. 24, 2015

(54) VALVE CONFIGURED FOR REGULATING THE FLOW OF FLUID FROM A TRANSMISSION TO A FLUID COOLER

(75) Inventors: Vijay A. Neelakantan, Rochester Hills, MI (US); Paul G. Otanez, Troy, MI (US); Shushan Bai, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 709 days.

(21) Appl. No.: 13/213,138

(22) Filed: Aug. 19, 2011

(65) Prior Publication Data

US 2013/0042927 A1 Feb. 21, 2013

(51) Int. Cl.
| | |
|---|---|
| *F01P 7/16* | (2006.01) |
| *G05D 23/02* | (2006.01) |
| *F16H 57/04* | (2010.01) |
| *F16K 11/044* | (2006.01) |
| *F16K 11/07* | (2006.01) |
| *F16K 31/00* | (2006.01) |

(52) U.S. Cl.
CPC ........ *F16H 57/0413* (2013.01); *F16H 57/0417* (2013.01); *F16K 11/044* (2013.01); *F16K 11/07* (2013.01); *F16K 31/002* (2013.01)
USPC ...................... 236/34.5; 236/93 R; 236/101 A

(58) Field of Classification Search
USPC ................. 236/34, 34.5, 93 R, 101 R, 101 A; 477/98; 180/339
See application file for complete search history.

(56) References Cited

U.S. PATENT DOCUMENTS

| 3,913,831 | A  | * | 10/1975 | Talak ........................... 236/34.5 |
| 4,190,198 | A  |   | 2/1980  | Casuga et al. |
| 4,522,219 | A  |   | 6/1985  | Ohkata |
| 6,253,837 | B1 | * | 7/2001  | Seiler et al. ................... 165/103 |
| 7,997,505 | B2 |   | 8/2011  | Martin et al. |
| 8,191,794 | B2 | * | 6/2012  | Sasaki et al. ................ 236/99 K |
| 2007/0295016 | A1 |   | 12/2007 | Robin |
| 2008/0029246 | A1 |   | 2/2008  | Fratantonio et al. |
| 2008/0202450 | A1 |   | 8/2008  | Martin et al. |
| 2013/0139906 | A1 | * | 6/2013  | Neelakantan et al. ........ 137/334 |

FOREIGN PATENT DOCUMENTS

WO 2010057308 A1 5/2010

* cited by examiner

*Primary Examiner* — Marc Norman
(74) *Attorney, Agent, or Firm* — Quinn Law Group, PLLC

(57) ABSTRACT

A transmission fluid circuit includes a transmission, a cooler, and a valve. The transmission receives and expels a fluid. The cooler receives and expels the fluid to the transmission. The valve directs the flow of fluid received from the transmission to one of the transmission and the fluid cooler. The valve includes a housing, a spool and an actuator. The housing defines a cavity. The spool is movable longitudinally in the cavity between a first position and a second position to direct the flow of the fluid from the cavity to the cooler or the transmission. The actuator is operatively connected to the spool and includes a smart material which is activated in response to the temperature of the fluid in the cavity having at least a first temperature and deactivated in response to the fluid in the cavity having a sufficient number of degrees less than the first temperature.

19 Claims, 7 Drawing Sheets

VALVE CONFIGURED FOR REGULATING THE FLOW OF FLUID FROM A TRANSMISSION TO A FLUID COOLER

TECHNICAL FIELD

The invention relates to a transmission fluid circuit.

BACKGROUND

Vehicles typically include an engine and a transmission. To operate properly, the transmission requires a supply of fluid, such as conventional transmission oil. The fluid may be used for such functions as cooling and lubrication. The lubricating and cooling capabilities of transmission oil systems greatly impact the reliability and durability of the transmission. Additionally, multi-speed power transmissions require fluid for controlled engagement and disengagement, on a desired schedule, of the various torque transmitting mechanisms that operate to establish the speed ratios within the internal gear arrangement.

SUMMARY

A transmission fluid circuit includes a transmission, a cooler, and a valve. The transmission is configured for receiving and expelling a fluid. The cooler is configured for receiving and expelling the fluid to the transmission. The valve is configured for directing the flow of fluid received from the transmission to one of the transmission and the fluid cooler. The valve includes a housing, a spool and an actuator. The housing defines a cavity which extends longitudinally between a first end and a second end. The cavity is configured for receiving and expelling the fluid. The spool is disposed in the cavity and is movable longitudinally therein between a first position and a second position. The actuator is operatively disposed within the cavity and is configured to act on the spool. The actuator is in fluid communication with the fluid and includes a smart material configured to be activated in response to the temperature of the fluid in the cavity having at least a first temperature such that activation of the smart material activates the actuator. The smart material is configured to be deactivated in response to the fluid in the cavity having a sufficient number of degrees less than the first temperature such that the smart material deactivates the actuator. The actuator acts on the spool when activated to move the spool from the first position to the second position. The fluid is only permitted to flow from the cavity to the cooler, the cooler to the transmission, and from the transmission to the cavity when the spool is in the second position. The spool moves from the second position to the first position when the actuator is deactivated. The fluid is only permitted to flow from the cavity to the transmission and from the transmission to the cavity when the spool is in the first position.

In another embodiment, the transmission fluid circuit includes a transmission, a cooler, and a valve. The transmission is configured for receiving and expelling a fluid. The cooler is configured for receiving and expelling the fluid to the transmission. The valve is configured for directing the flow of fluid received from the transmission to one of the transmission and the fluid cooler. The valve includes a housing, a spool, and an actuator. The housing defines a cavity which extends longitudinally between a first end and a second end. The cavity is configured for receiving and expelling the fluid. The housing includes a first inlet, a first outlet, a second inlet, a second outlet, a third inlet, and a third outlet in fluid communication with the cavity. The spool is disposed in the cavity and is movable longitudinally therein between a first position and a second position. The first inlet provides fluid communication from the transmission to a first portion of the cavity that is defined between the spool and the first end of the housing. The actuator is operatively disposed within the cavity and configured to act on the spool. The actuator is in fluid communication with the fluid and includes a smart material configured to be activated in response to the temperature of the fluid in the cavity having at least a first temperature such that activation of the smart material activates the actuator. The smart material is configured to be deactivated in response to the fluid in the cavity having less than the first temperature such that the smart material deactivates the actuator. The actuator acts on the spool when activated to move the spool from the first position to the second position. The fluid is only permitted to flow through the third outlet from the cavity to the cooler, the cooler to the transmission, and from the transmission to the cavity through the first inlet when the spool is in the second position. The actuator acts on the spool when deactivated to move the spool from the second position to the first position. The fluid is only permitted to flow through the second outlet from the cavity to the transmission and from the transmission to the cavity through the first inlet when the spool is in the first position.

In yet another embodiment, a transmission fluid circuit includes a transmission, a cooler, and a valve. The transmission is configured for receiving and expelling a fluid. The cooler is configured for receiving and expelling the fluid to the transmission. The valve is configured for directing the flow of fluid received from the transmission to one of the transmission and the fluid cooler. The valve includes a housing, a spool, an actuator, and a biasing device. The housing defines a cavity which extends longitudinally between a first end and a second end. The cavity is configured for receiving and expelling the fluid. The housing includes a first inlet, a second outlet, and a third outlet in fluid communication with the cavity. The spool is disposed in the cavity and is movable longitudinally therein between a first position and a second position. The first inlet provides fluid communication from the transmission to a first portion of the cavity that is defined between the spool and the first end of the housing. The actuator is operatively disposed within the cavity and is configured to act on the spool. The actuator is in fluid communication with the fluid and includes a smart material configured to be activated in response to the fluid in the cavity having at least a first temperature such that activation of the smart material activates the actuator. The smart material is configured to be deactivated in response to the fluid in the cavity having less than the first temperature such the smart material deactivates the actuator. The actuator acts on the spool when activated to move the spool from the first position to the second position. The fluid is only permitted to flow through the third outlet from the cavity to the cooler, the cooler to the transmission, and from the transmission to the cavity through the first inlet when the spool is in the second position. The biasing device is disposed in the cavity. The biasing device continuously reacts against the spool to move the spool to the first position when the actuator is deactivated. The fluid is only permitted to flow through the second outlet from the cavity to the transmission and from the transmission to the cavity through the first inlet when the spool is in the first position.

The above features and advantages and other features and advantages of the present invention are readily apparent from the following detailed description of the best modes for carrying out the invention when taken in connection with the accompanying drawings.

DETAILED DESCRIPTION

Figure 1:
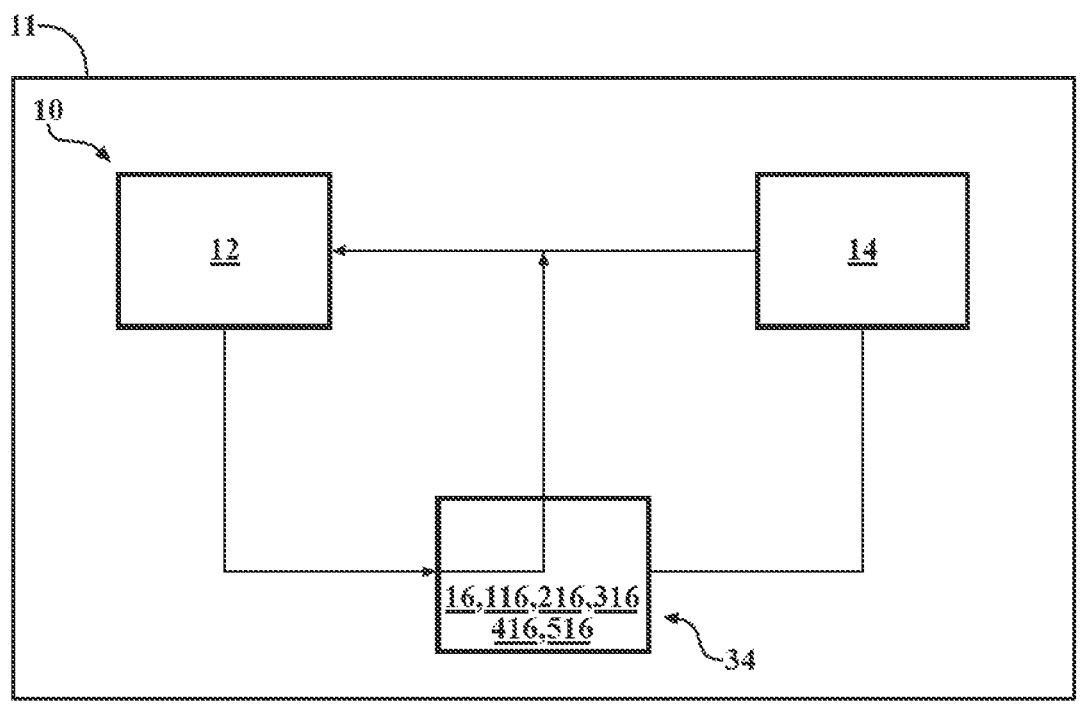
FIG. 1 is a schematic diagram of a transmission fluid circuit of a vehicle having a transmission, a fluid cooler, and a valve in a first position such that fluid flows from the transmission, through the valve, and back into the transmission, bypassing the fluid cooler.
Figure 2:
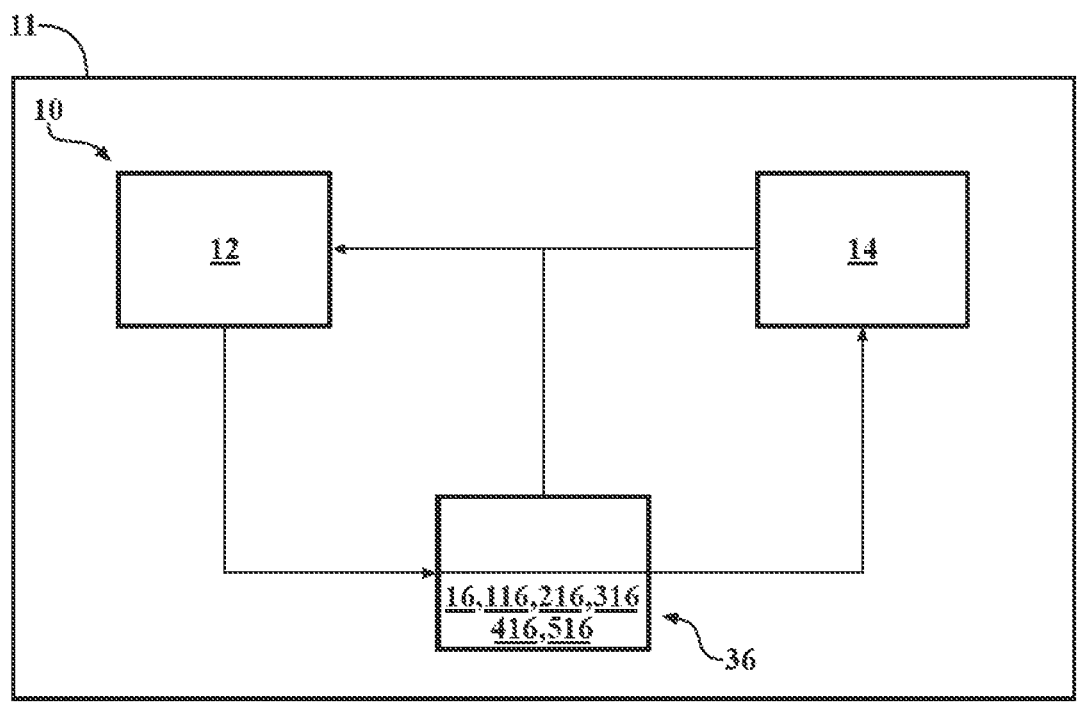
FIG. 2 is the fluid circuit of FIG. 1 with the valve in a second position such that fluid flows from the transmission, through the valve, through the fluid cooler, and back into the transmission.

Referring to the Figures, wherein like reference numerals refer to like elements, a transmission fluid circuit 10 is shown generally at 10 in FIGS. 1 and 2. The transmission fluid circuit 10 includes a transmission, a fluid cooler 14, and a valve 16. As will be explained in more detail below, the valve 16 is configured for regulating the circulation of a fluid 18 between the transmission and the fluid cooler 14. The fluid 18 may be an automatic transmission fluid 18 (ATF) and the like. The transmission may be an automatic transmission for a vehicle 11 which is configured for receiving and expelling the fluid 18.

The fluid cooler 14 may be an automatic transmission fluid cooler 14 and the like. The cooler is configured for receiving the fluid 18 from the valve 16 and expelling the fluid 18 to the transmission, when the fluid cooler 14 is not blocked (as explained in more detail below).

In order to cool the transmission during operation, the valve 16 is configured to direct the flow of the fluid 18 from the transmission to the fluid cooler 14 and from the fluid cooler 14 to the transmission when the fluid 18 being expelled from the transmission is at least a first temperature (FIG. 2). Likewise, when the fluid 18 being expelled from the transmission is below the first temperature, the valve 16 directs the fluid 18 being expelled from the transmission, back into the transmission, bypassing the fluid cooler 14 (FIG. 1). Therefore, the fluid cooler 14 only operates when the fluid 18 is at least the first temperature, resulting in vehicle energy savings by preventing unnecessary operation of the fluid cooler 14 at temperatures less than the first fluid temperature.

Figure 3:
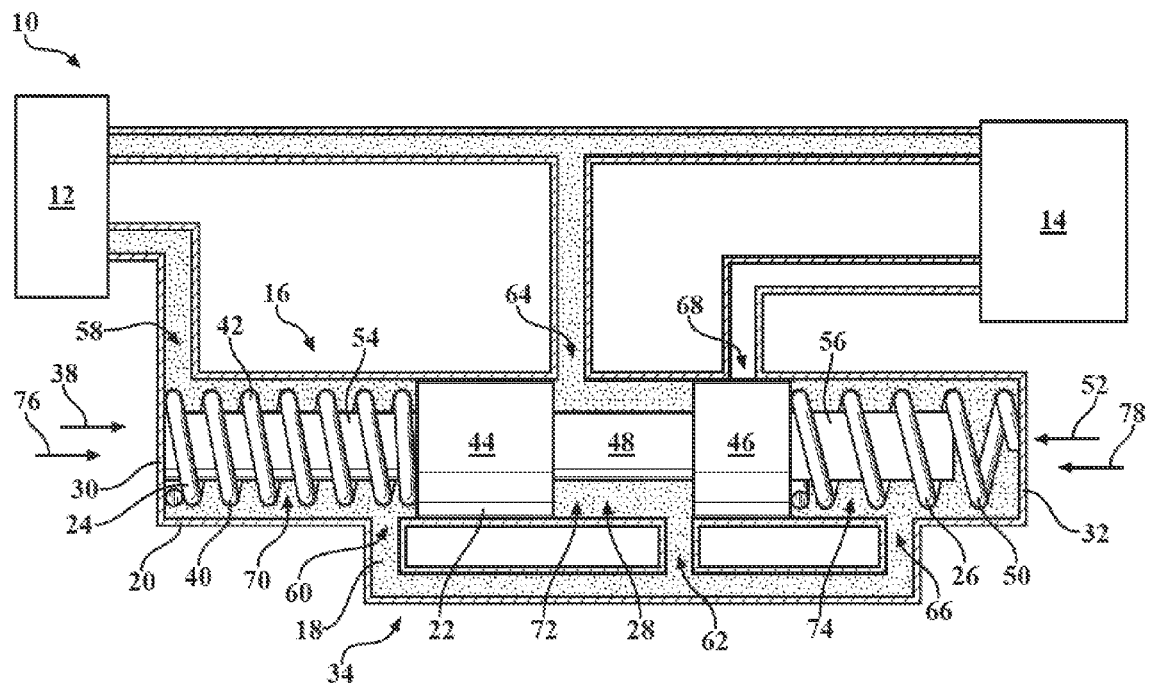
FIG. 3 is a schematic cross-sectional view of the first embodiment of the valve, shown in the first position.
Figure 4:
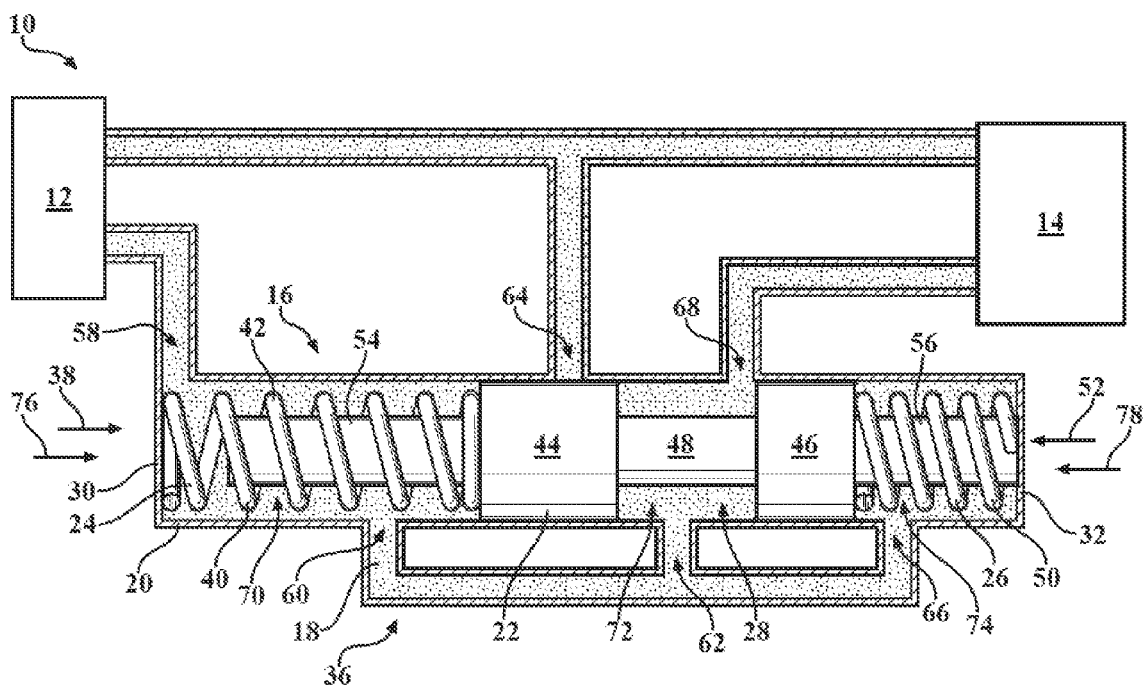
FIG. 4 is a schematic cross-sectional view of the valve of FIG. 3, shown in the second position.

Referring generally to FIGS. 3-14, the valve 16 includes a housing 20, a spool 22, an actuator 24, and a biasing device 26. The housing 20 defines a cavity 28 which extends longitudinally between a first end 30 and a second end 32. The cavity 28 is configured for receiving and expelling the fluid 18. The spool 22 is disposed in the cavity 28 and is movable longitudinally therein between a first position 34 (FIG. 3) and a second position 36 (FIG. 4).

The actuator 24 is operatively disposed within the cavity 28 and is configured to act on the spool 22 with a first force 38, as explained in more detail below. The actuator 24 is in fluid communication with the fluid 18. The actuator 24 includes a smart material 40. The smart material 40 may be a shape memory alloy (SMA) material which is configured to be activated in response to the fluid 18 in the cavity 28 having at least the first temperature such that activation of the SMA material 40 activates the actuator 24. The SMA material 40 is configured to be deactivated in response to the fluid 18 in the cavity 28 having a sufficient number of degrees less than the first temperature such the SMA material 40 deactivates the actuator 24. More specifically, the SMA material 40 exhibits a temperature hysteresis in its phase transformations. The magnitude of the hysteresis is typically between five degrees and forty degrees Celsius (C). The specific magnitude of the hysteresis in a particular application is a function of several parameters, including the material formulation of the SMA material 40 and the stress state of the SMA material 40.

The SMA material 40 has a crystallographic phase changeable between austenite and martensite in response to exposure to a temperature of at least the first temperature and a temperature below the second temperature, which is typically lower than the first temperature. As used herein, the terminology SMA refers to alloys which exhibit a shape memory effect. That is, the SMA material 40 may undergo a solid state phase change via atomic rearrangement to shift between a martensite phase, i.e., "martensite", and an austenite phase, i.e., "austenite". Stated differently, the SMA material 40 may undergo a displacive transformation rather than a diffusional transformation to shift between martensite and austenite. A displacive transformation is when a structural change occurs by the coordinated movement of atoms (or groups of atoms) relative to their neighbors. In general, the martensite phase refers to the comparatively lower-temperature phase and is often more deformable than the comparatively higher-temperature austenite phase. The temperature at which the shape memory alloy material begins to change from the austenite phase to the martensite phase is known as the martensite start temperature, $M_s$. The temperature at which the SMA material 40 completes the change from the austenite phase to the martensite phase is known as the martensite finish temperature, $M_f$. Similarly, as the SMA material 40 is heated, the temperature at which the SMA material 40 begins to change from the martensite phase to the austenite phase is known as the austenite start temperature, $A_s$. The temperature at which the SMA material 40 completes the change from the martensite phase to the austenite phase is known as the austenite finish temperature, $A_f$.

Therefore, the SMA material 40 may be characterized by a cold state, i.e., when a temperature of the SMA material 40 is below the martensite finish temperature $M_f$ of the SMA material 40. Likewise, the SMA material 40 may also be characterized by a hot state, i.e., when the temperature of the SMA material 40 is above the austenite finish temperature $A_f$ of the SMA material 40.

In operation, SMA material 40 that is pre-strained or subjected to tensile stress can change dimension upon changing crystallographic phase to thereby convert thermal energy to mechanical energy. That is, the SMA material 40 may change crystallographic phase from martensite to austenite and thereby dimensionally contract if pseudoplastically pre-strained so as to convert thermal energy to mechanical energy. Conversely, the SMA material 40 may change crystallographic phase from austenite to martensite and if under stress thereby dimensionally expand.

"Pseudoplastically pre-strained" refers to stretching the SMA material 40 while in the martensite phase so that the strain exhibited by the SMA material 40 under that loading condition is not fully recovered when unloaded, where purely elastic strain would be fully recovered. In the case of SMA material 40, it is possible to load the material such that the elastic strain limit is surpassed and deformation takes place in the martensitic crystal structure of the material prior to exceeding the true plastic strain limit of the SMA material 40. Strain of this type, between those two limits, is pseudoplastic strain, called such because upon unloading it appears to have plastically deformed, but when heated to the point that the SMA material 40 transforms to its austenite phase, that strain can be recovered, returning the SMA material 40 to the original length observed prior to being subjected to any applied loading.

The SMA material 40 may have any suitable composition. In particular, the SMA material 40 may include an element selected from the group including cobalt, nickel, titanium, indium, manganese, iron, palladium, zinc, copper, silver, gold, cadmium, tin, silicon, platinum, gallium, and combinations thereof. For example, suitable SMA materials 40 may include nickel-titanium based alloys, nickel-aluminum based alloys, nickel-gallium based alloys, indium-titanium based alloys, indium-cadmium based alloys, nickel-cobalt-aluminum based alloys, nickel-manganese-gallium based alloys, copper based alloys (e.g., copper-zinc alloys, copper-aluminum alloys, copper-gold alloys, and copper-tin alloys), gold-cadmium based alloys, silver-cadmium based alloys, manganese-copper based alloys, iron-platinum based alloys, iron-palladium based alloys, and combinations thereof. The SMA material 40 can be binary, ternary, or any higher order so long as the SMA material 40 exhibits a shape memory effect, e.g., a change in shape orientation, damping capacity, and the like.

The actuator 24 is activated by the temperature of the fluid 18 being at least equal to the first temperature. When the actuator 24 is activated, the actuator 24 acts on the spool 22 to move the spool 22 from the first position 34, shown in FIGS. 3, 5, 7, 9, 11, and 13, to the second position 36, shown in FIGS. 4, 6, 8, 10, 12, and 14. The fluid 18 is permitted to flow from the cavity 28 of the valve 16 to the fluid cooler 14, from the fluid cooler 14 to the transmission, and from the transmission to the cavity 28 when the spool 22 is in the second position 36.

The actuator 24 is deactivated by the temperature of the fluid 18 being a sufficient number of degrees less than the first temperature. When the actuator 24 is deactivated, the spool 22 moves from the second position 36 to the first position 34. When the spool 22 is in the first position 34, the fluid 18 is only permitted to flow from the cavity 28 to the transmission and from the transmission to the cavity 28, bypassing the fluid cooler 14.

In the embodiments shown in FIGS. 3-4 and 13-14, the SMA material 40 longitudinally expands when activated. In the embodiments shown in FIGS. 5-12, the SMA material 40 is configured to longitudinally contract when activated.

Referring now to the valve 16 shown in FIGS. 3 and 4, the actuator 24 is a coil spring 42 that includes the SMA material 40. The spool 22 is disposed in the cavity 28 and is movable longitudinally therein between the first position 34, shown in FIG. 3, and the second position 36, shown in FIG. 4. The coil spring 42 is operatively disposed within the cavity 28 and is configured to act on the spool 22. The spool 22 includes a first section 44, a second section 46, and an intermediate section 48. The first section 44 is longitudinally spaced from the second section 46. The intermediate section 48 connects the first section 44 to the second section 46. The first section 44 and the second section 46 are radially sized to fit within the cavity 28 such that the fluid 18 is prevented from passing within the cavity 28 between the first section 44 or the second section 46 and the housing 20. The intermediate section 48 is radially sized to be smaller than the first section 44 and second section 46 such that the fluid 18 is allowed to flow radially about the intermediate section 48, between the intermediate section 48 and the housing 20. The coil spring 42 is operatively disposed in the cavity 28 between the first section 44, opposite the intermediate section 48, and the housing 20. The coil spring 42 is configured to act on the first section 44 and apply the first force 38. The biasing device 26 is operatively disposed in the cavity 28 between the second section 46, opposite the intermediate section 48, and the housing 20. The biasing device 26 may be a compression spring 50 and is configured to act on the second section 46 and apply a second force 52 to the spool 22, opposite the first force 38 applied by the coil spring 42.

The first section 44 may include a first nose 54 that extends longitudinally, opposite the intermediate section 48. The first nose 54 is configured for limiting longitudinal movement of the spool 22 within the cavity 28 in the second longitudinal direction 78 by contacting with the housing 20. The coil spring 42 is coiled about the first nose 54 such that the first nose 54 is longitudinally disposed between the first section 44 and the housing 20. The second section 46 may also include a second nose 56 that extends longitudinally, opposite the intermediate section 48. The second nose 56 is configured for limiting longitudinal movement of the spool 22 within the cavity 28 in the first longitudinal direction 76 by contacting the housing 20. The compression spring 50 is coiled about the second nose 56 such that the second nose 56 is longitudinally disposed between the second section 46 and the housing 20.

The housing 20 defines a first inlet 58, a first outlet 60, a second inlet 62, a second outlet 64, a third inlet 66, and a third outlet 68 that are each in fluid communication with the cavity 28. The first inlet 58 provides fluid communication from the transmission to a first portion 70 of the cavity 28 that is defined between the first section 44 and the housing 20, opposite the intermediate section 48. The first outlet 60 provides fluid communication from the first portion 70 of the cavity 28 to each of the second inlet 62 and the third inlet 66. The second inlet 62 provides fluid communication from the first outlet 60 to a second portion 72 of the cavity 28 defined between the first section 44 and the second section 46. The third inlet 66 provides fluid communication from the first outlet 60 to a third portion 74 of the cavity 28 that is defined between the second section 46 and the housing 20, opposite the intermediate section 48. The second outlet 64 provides fluid communication from the second portion 72 of the cavity 28 to only the transmission when the spool 22 is in the first position 34, as shown in FIG. 3. The third outlet 68 provides fluid communication from the second portion 72 of the cavity 28 to the fluid cooler 14 when the spool 22 is in the second position 36, as shown in FIG. 4. In the second position 36, once the fluid 18 passes through the fluid cooler 14, the fluid 18 then flows to the transmission. More specifically, when the spool 22 is in the first position 34, shown in FIG. 3, the second section 46 of the spool 22 blocks the third outlet 68, while leaving the second outlet 64 open to allow fluid communication from the second portion 72 of the cavity 28 to the transmission. Likewise, when the spool 22 is in the second position 36, shown in FIG. 4, the first section 44 of the spool 22 blocks the second outlet 64, while leaving the third outlet 68 open to allow fluid communication from the second portion 72 of the cavity 28 to the fluid cooler 14.

The coil spring 42 is disposed in the first portion 70 of the cavity 28 and is also in fluid communication with the fluid 18 disposed in the first portion 70 of the cavity 28. When the fluid 18 is at a temperature that is a sufficient number of degrees less than the first temperature, the coil spring 42 is deactivated. Likewise, when the fluid 18 is at a temperature that is greater than the first temperature, the coil spring 42 is activated.

Referring specifically to FIG. 3, the fluid 18 is at a temperature that is a sufficient number of degrees less than the first temperature and the coil spring 42 is deactivated, such that the coil spring 42 is longitudinally contracted. The contracted coil spring 42 acts on the first section 44 of the spool 22 in the first longitudinal direction 76 with a first force 38 while the biasing device 26 acts on a second section 46 of the spool 22 in a second longitudinal direction 78, opposite the first longitudinal direction 76, with a second force 52, which is greater than the first force 38 of the coil spring 42, to maintain the spool 22 in the first position 34. In the first position 34, the fluid 18 flows out of the first portion 70 of the cavity 28, through the first outlet 60, and into the second portion 72 of the cavity 28, through the second inlet 62, and the third portion 74 of the cavity 28, through the third inlet 66. The fluid 18 flows out of the second portion 72 of the cavity 28, through the second outlet 64, and back into the transmission. Therefore, in the first position 34, the fluid 18 is prevented from flowing from the cavity 28 and into the fluid cooler 14. Additionally, the actuator 24, including the SMA material 40, is totally immersed in the flowing fluid 18 such that the temperature is even across the whole actuator 24 and always equal to the temperature of the fluid 18.

Referring to FIG. 4, the fluid 18 is at a temperature that is at least equal to the first temperature and the coil spring 42 is activated. Since the temperature of the fluid 18 is at least equal to the first temperature, the coil spring 42 is activated and longitudinally expands, increasing the magnitude of the first force 38 such that the first force 38 is greater than the second force 52 of the biasing device 26. The coil spring 42 acts on the first section 44 of the spool 22 in the first longitudinal direction 76 with the first force 38 while the biasing device 26 acts on the second section 46 with the second force 52, which is less than the first force 38 of the coil spring 42, to move the spool 22 in the first longitudinal direction 76 and to maintain the spool 22 in the second position 36. Therefore, the first force 38 of the coil spring 42 acting on the first section 44 of the spool 22 overcomes the second force 52 of the biasing device 26 acting on the second section 46 of the spool 22 to move the spool 22 in the first longitudinal direction 76 from the first position 34 to the second position 36. In the second position 36, the fluid 18 flows out of the first portion 70 of the cavity 28, through the first outlet 60, and back into the second portion 72 of the cavity 28, through the second inlet 62, and the third portion 74 of the cavity 28, through the third inlet 66. The fluid 18 flows out of the second portion 72 of the cavity 28, through the third outlet 68, and into the fluid cooler 14. The fluid 18 that flows through the fluid cooler 14 is cooled by the fluid cooler 14 and then flows from the fluid cooler 14, back into the transmission. When the spool 22 is in the second position 36, the first section 44 blocks the second outlet 64 such that the fluid 18 is prevented from flowing directly from the cavity 28 back into the transmission.

Figure 5:
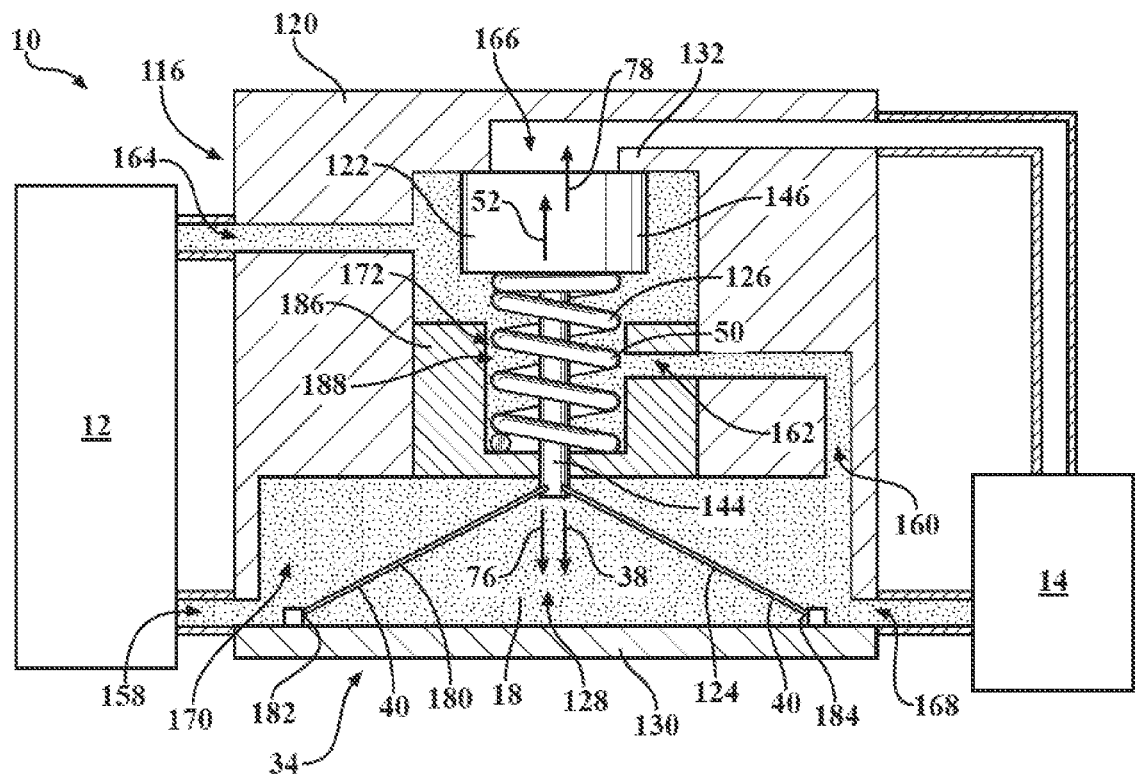
FIG. 5 is a schematic cross-sectional view of the second embodiment of the valve, shown in the first position.
Figure 6:
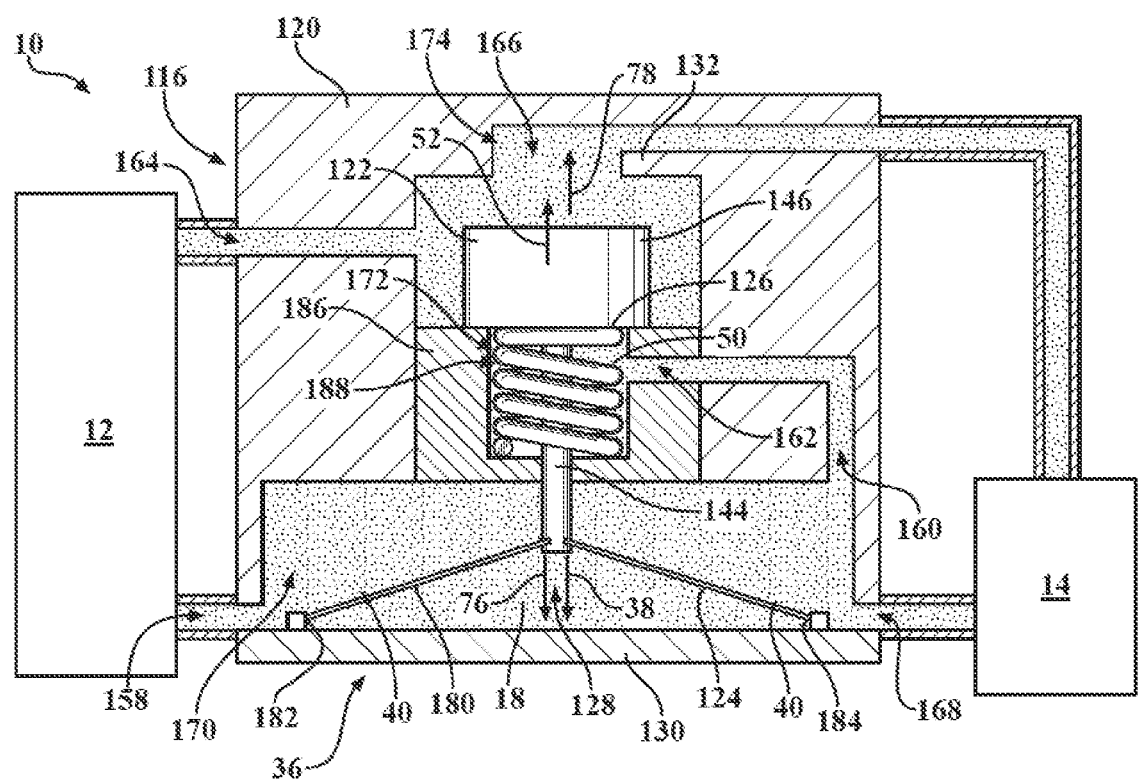
FIG. 6 is a schematic cross-sectional view of the valve of FIG. 5, shown in the second position.

Referring to the valve 116 shown in FIGS. 5 and 6, the actuator 124 is a wire 180 that includes the SMA material 40 and the biasing device 126 is a compression spring 50. The spool 122 is disposed in the cavity 128 defined by the housing 120 and is movable longitudinally therein between the first position 34, shown in FIG. 5, and the second position 36, shown in FIG. 6. The housing 120 extends between a first end 130 and a second end 132. The wire 180 is operatively disposed within the cavity 128 and is configured to act on the spool 122. The spool 122 includes a second section 146 and a first section 144 which extends longitudinally from the second section 146. The wire 180 operatively interconnects the first section 144 and the housing 120. More specifically, referring to FIGS. 5 and 6, the wire 180 is shown to extend between a first wire end 182 and a second wire end 184. The first wire end 182 and the second wire end 184 are each operatively attached to the housing 120, at the first end 130, in spaced relationship to one another and the wire 180 is operatively attached to the first section 144 between the first wire end 182 and the second wire end 184. It should be appreciated that the wire 180 may also be two separate wires 180, instead of a single wire 180, which are each attached to the housing 120 and the first section 144. The wire 180 may also be a single wire 180 operatively attached to the housing 120 only at one location such that the single wire 180 operatively extends between the housing 120 and the first section 144.

The housing 120 includes a nest 186, fixedly disposed in the cavity 128. The nest 186 defines an aperture 188. The first section 144 of the spool 122 extends through the compression spring 50 and the aperture 188 such that the compression spring 50 reacts between the nest 186 and the second section 146. The wire 180 is configured to act on the first section 144 such that the wire 180 applies the first force 38 to the first section 144 of the spool 122. The biasing device 126 is configured to react between the nest 186 and the second section 146 such that the biasing device 126 applies the second force 52 to the second section 146 of the spool 122, opposite the first force 38 applied by the wire 180.

The housing 120 defines the first inlet 158, the first outlet 160, the second inlet 162, the second outlet 164, the third inlet 166, and the third outlet 168. The first inlet 158 provides fluid communication from the transmission 12 to the first portion 170 of the cavity 128 that is defined between the nest 186 and the housing 120, opposite the second section 146. The first outlet 160 provides fluid communication from the first portion 170 of the cavity 128 to the second inlet 162. The second outlet 164 provides fluid communication from the second portion 172 of the cavity 128 to the transmission when the spool 122 is in first position 34, as shown in FIG. 5. The second outlet 164 provides fluid communication from the third portion 174 of the cavity 128 to the transmission when the spool 122 is in the second position 36, as shown in FIG. 6. The third outlet 168 provides fluid communication from the first portion 170 of the cavity 128 to the fluid cooler 14. The third inlet 166 provides fluid communication from the fluid cooler 14 to the third portion 174 of the cavity 128. However, as explained in more detail below, the fluid 18 is only allowed to flow from the first second of the cavity 128, through the fluid cooler 14, and into the third section of the cavity 128 when the spool 122 is in the second position 36 (FIG. 6).

The wire 180 is disposed in the first portion 170 of the cavity 128 and is also in fluid communication with the fluid 18 disposed in the first portion 170 of the cavity 128. When the fluid 18 is at a temperature that is a sufficient number of degrees less than the first temperature, the wire 180 is deactivated. Likewise, when the fluid 18 is at a temperature that is greater than the first temperature, the wire 180 is activated.

Referring specifically to FIG. 5, the fluid 18 is at a temperature that is a sufficient number of degrees less than the first temperature and the wire 180 is deactivated such that the wire 180 is longitudinally expanded. The expanded wire 180 acts on the first section 144 of the spool 122 in the first longitudinal direction 76 with the first force 38 while the biasing device 126 acts on the second section 146 of the spool 122 in the second longitudinal direction 78 with the second force 52, which is greater than the first force 38 of the wire 180, to maintain the spool 122 in the first position 34. In the first position 34, the fluid 18 flows out of the first portion 170 of the cavity 128, through the first outlet 160, and into the second portion 172 of the cavity 128, through the second inlet 162. The fluid 18 flows out of the second portion 172 of the cavity 128, through the second outlet 164, and back into the transmission. In the first position 34, the second section 146 of the spool 122 blocks the third inlet 166, preventing the fluid 18 from flowing through the fluid cooler 14 and into the third section of the cavity 128. Therefore, in the first position 34, the fluid 18 is prevented from flowing from the cavity 128 and into the fluid cooler 14. Additionally, the actuator 124, including the SMA material 40, is totally immersed in the flowing fluid 18 such that the temperature is even across the whole actuator 124 and always equal to the temperature of the fluid 18

Referring to FIG. 6, the fluid 18 is at a temperature that is at least equal to the first temperature and the wire 180 is activated. Since the temperature of the fluid 18 is at least equal to the first temperature, the wire 180 is activated and longitudinally contracts, increasing the magnitude of the first force 38 such that the first force 38 is greater than the second force 52 of the biasing device 126. The wire 180 acts on the first section 144 of the spool 122 in the first longitudinal direction 76 with the first force 38 while the biasing device 126 acts on the second section 146 of the spool 122 with the second force 52, which is less than the first force 38 of the wire 180, to move the spool 122 in the first longitudinal direction 76 and to maintain the spool 122 in the second position 36. Therefore, the first force 38 of the wire 180 acting on the first section 144 of the spool 122 overcomes the second force 52 of the biasing device 126 acting on the second section 146 of the spool 122 to move the spool 122 in the first longitudinal direction 76 from the first position 34 to the second position 36. In the second position 36, the second section 146 of the spool 122 is moved longitudinally to unblock the third inlet 166 to allow fluid communication from the fluid cooler 14 to the third portion 174 of the cavity 128. Therefore, in the second position 36, the fluid 18 flows out of the first portion 170 of the cavity 128 through the third outlet 168, through the fluid cooler 14 to cool the fluid 18, and the cooled fluid 18 flows into the third portion 174 of the cavity 128 through the third inlet 166. The fluid 18 flows from the third portion 174 of the cavity 128, through the second outlet 164, and into the transmission. When the spool 122 is in the second position 36, the second section 146 abuts the nest 186 such that second section 146 of the spool 122 blocks the second inlet 162, preventing the high temperature, uncooled fluid 18 from flowing from the first portion 170 of the cavity 128 and through the second portion 172 of the cavity 128 and back into the transmission.

Figure 7:
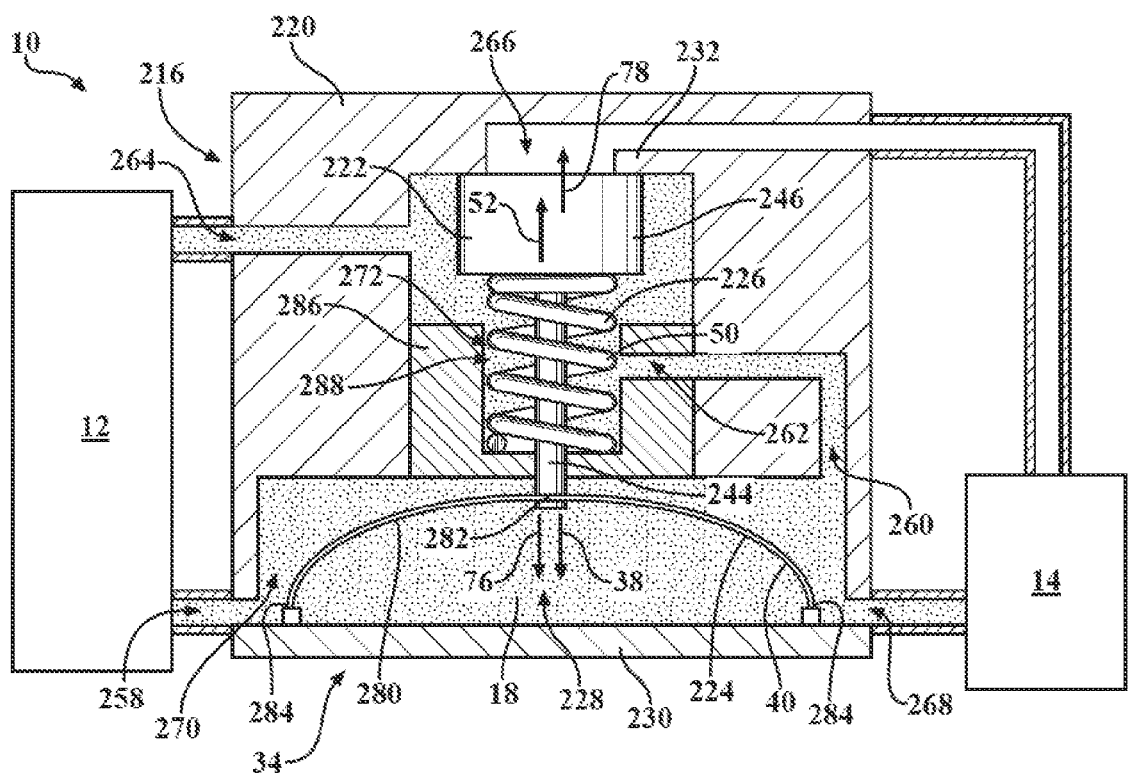
FIG. 7 is a schematic cross-sectional view of the third embodiment of the valve, shown in the first position
Figure 8:
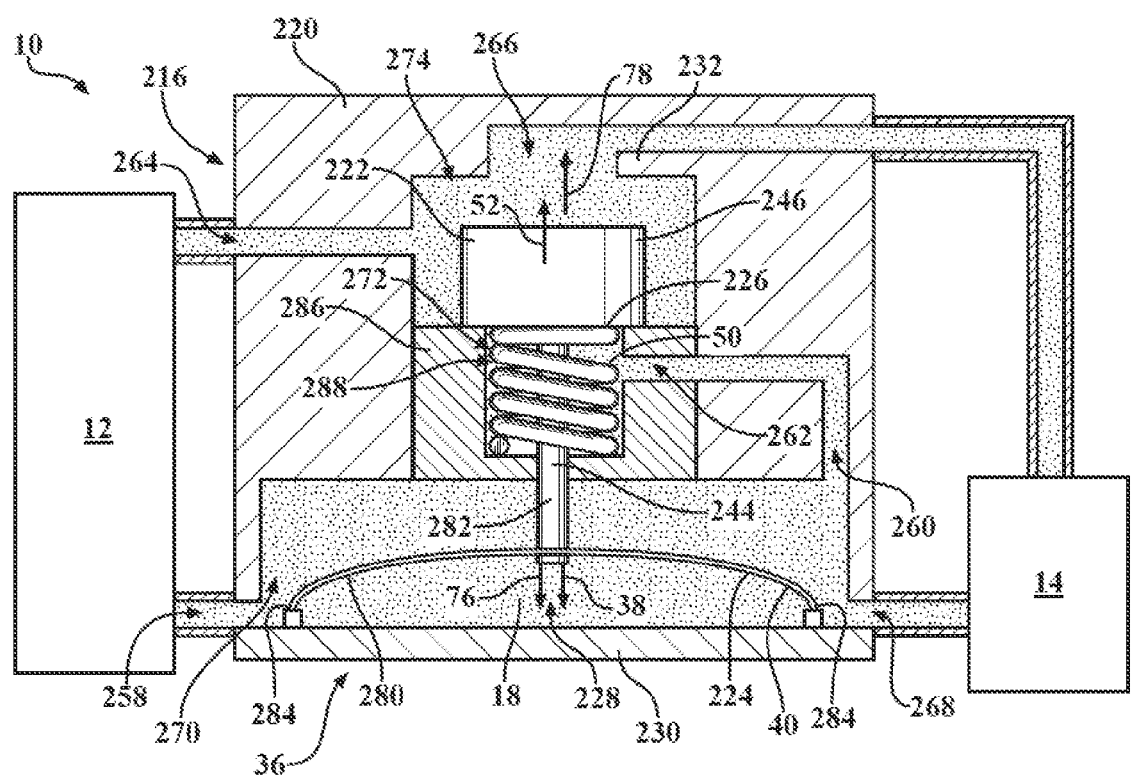
FIG. 8 is a schematic cross-sectional view of the valve of FIG. 7, shown in the second position.

Referring to the valve 216 shown in FIGS. 7 and 8, the actuator 224 is a membrane 280 that includes the SMA material 40 and the biasing device 226 is a compression spring 50. The membrane 280 may be a pliable sheet-like structure. The spool 222 is disposed in the cavity 228 which is defined by the housing 220 and is movable longitudinally therein between the first position 34, shown in FIG. 7, and the second position 36, shown in FIG. 8. The housing 220 extends between a first end 230 and a second end 232. The membrane 280 is operatively disposed within the cavity 228 and is configured to act on the spool 222. The spool 222 includes a second section 246 and a first section 244 which extends longitudinally from the second section 246. The membrane 280 operatively interconnects the first section 244 and the housing 220. More specifically, the membrane 280 includes a center portion 282 which extends to an outer edge portion 284. The membrane 280 is operatively attached to the first section 244 at the center portion 282 and is operatively attached to the first end 230 of the housing 220 at the outer edge portion 284.

The housing 220 includes a nest 286, fixedly disposed in the cavity 228. The nest 286 defines an aperture 288. The first section 244 of the spool 222 extends through the compression spring 50 and the aperture 288 such that the compression spring 50 reacts between the nest 286 and the second section 246. The membrane 280 is configured to act on the first section 244 such that the membrane 280 applies the first force 38 to the first section 244 of the spool 222. The biasing device 226 is configured to react between the nest 286 and the second section 246 such that the biasing device 226 applies the second force 52 to the second section 246 of the spool 222, opposite the first force 38 applied by the membrane 280.

The housing 220 defines a first inlet 258, a first outlet 260, a second inlet 262, a second outlet 264, a third inlet 266, and a third outlet 268. The first inlet 258 provides fluid communication from the transmission 12 to a first portion 270 of the cavity 228 that is defined between the nest 286 and the housing 220, opposite the second section 246. The first outlet 260 provides fluid communication from the first portion 270 of the cavity 228 to the second inlet 262. The second outlet 264 provides fluid communication from a second portion 272 of the cavity 228 to the transmission 12 when the spool 222 is in first position 34, as shown in FIG. 7. The second outlet 264 provides fluid communication from a third portion 274 of the cavity 228 to the transmission 12 when the spool 222 is in the second position 36, as shown in FIG. 8. The third outlet 268 provides fluid communication from the first portion 270 of the cavity 228 to the fluid cooler 14. The third inlet 266 provides fluid communication from the fluid cooler 14 to the third portion 274 of the cavity 228. However, as explained in more detail below, the fluid 18 is only allowed to flow from the first portion 270 of the cavity 228, through the fluid cooler 14, and into the third portion 274 of the cavity 228 when the spool 222 is in the second position 36 (FIG. 8).

The membrane 280 is disposed in the first portion 270 of the cavity 228 and is also in fluid communication with the fluid 18 disposed in the first portion 270 of the cavity 228. When the fluid 18 is at a temperature that is a sufficient number of degrees less than the first temperature, the membrane 280 is deactivated. Likewise, when the fluid 18 is at a temperature that is greater than the first temperature, the membrane 280 is activated.

Referring specifically to FIG. 7, the fluid 18 is at a temperature that is a sufficient number of degrees less than the first temperature and the membrane 280 is deactivated such that the membrane 280 is expanded. The membrane 280 acts on the first section 244 of the spool 222 in the first longitudinal direction 76 with a first force 38 while the biasing device 226 acts on the second section 246 of the spool 222 in the second longitudinal direction 78 with a second force 52, which is greater than the first force 38 of the membrane 280, to maintain the spool 222 in the first position 34. In the first position 34, the fluid 18 flows out of the first portion 270 of the cavity 228 through the first outlet 260 and into the second portion 272 of the cavity 228 through the second inlet 262. The fluid 18 flows out of the second portion 272 of the cavity 228, through the second outlet 264, and back into the transmission. In the first position 34, the second section 246 of the spool 222 blocks the third inlet 266, preventing the fluid 18 from flowing through the fluid cooler 14 and into the third section of the cavity 228. Therefore, in the first position 34, the fluid 18 is prevented from flowing from the cavity 228 and into the fluid cooler 14. Additionally, the actuator 224, including the SMA material 40, is totally immersed in the flowing fluid 18 such that the temperature is even across the whole actuator 224 and always equal to the temperature of the fluid 18

Referring to FIG. 8, the fluid 18 is at a temperature that is at least equal to the first temperature and the membrane 280 is activated. Since the temperature of the fluid 18 is at least equal to the first temperature, the membrane 280 is activated and contracts, increasing the magnitude of the first force 38 such that the first force 38 is greater than the second force 52 of the biasing device 226. The contracted membrane 280 acts on the first section 244 of the spool 222 in the first longitudinal direction 76 with the first force 38 while the biasing device 226 acts on the second section 246 of the spool 222 with the second force 52, which is less than the first force 38 of the membrane 280, to move the spool 222 in the first longitudinal direction 76 and to maintain the spool 222 in the second position 36. Therefore, the first force 38 of the membrane 280 acting on the first section 244 of the spool 222 overcomes the second force 52 of the biasing device 226 acting on the second section 246 of the spool 222 to move the spool 222 in the first longitudinal direction 76 from the first position 34 to the second position 36. In the second position 36, the second section 246 of the spool 222 is moved longitudinally to unblock the third inlet 266 to allow fluid communication from the fluid cooler 14 to the third portion 274 of the cavity 228. Therefore, in the second position 36, the fluid 18 flows out of the first portion 270 of the cavity 228 through the third outlet 268, through the fluid cooler 14 to cool the fluid 18, and the cooled fluid 18 flows into the third portion 274 of the cavity 228 through the third inlet 266. The fluid 18 flows from the third portion 274 of the cavity 228, through the second outlet 264, and into the transmission. When the spool 222 is in the second position 36, the second section 246 abuts the nest 286 such that second section 246 of the spool 222 blocks the second inlet 262, preventing the high temperature, uncooled fluid 18 from flowing from the first portion 270 of the cavity 228 and through the second portion 272 of the cavity 228 and back into the transmission.

Figure 9:
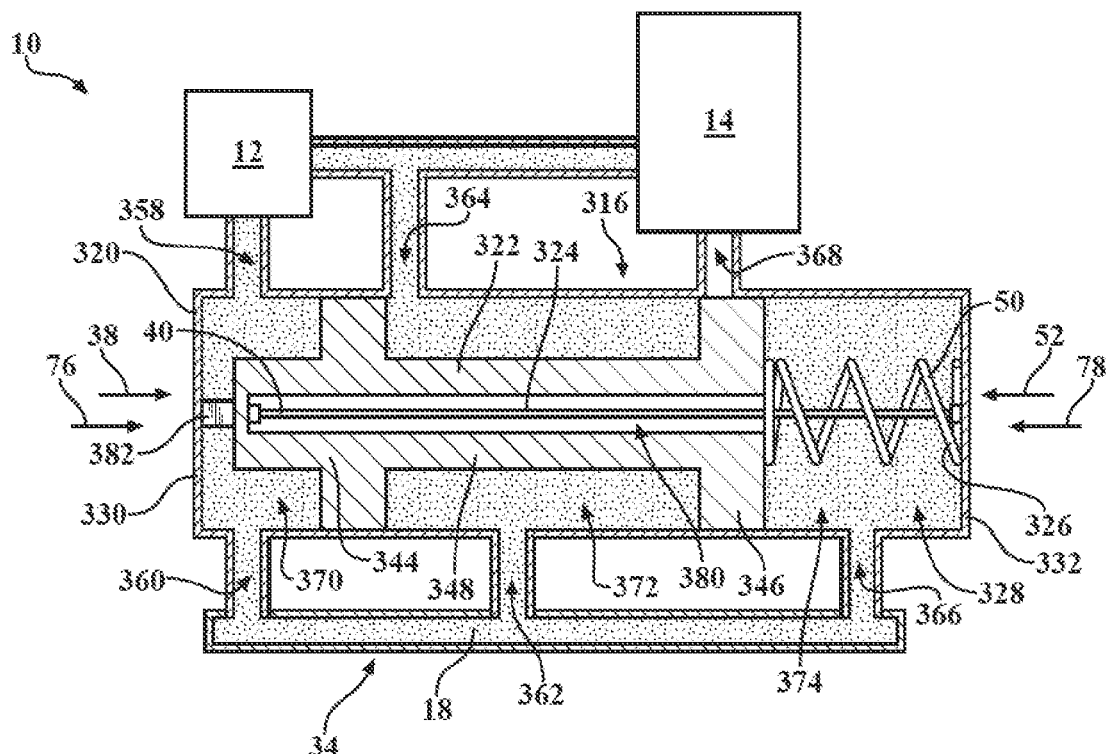
FIG. 9 is a schematic cross-sectional view of the fourth embodiment of the valve, shown in the first position.
Figure 10:
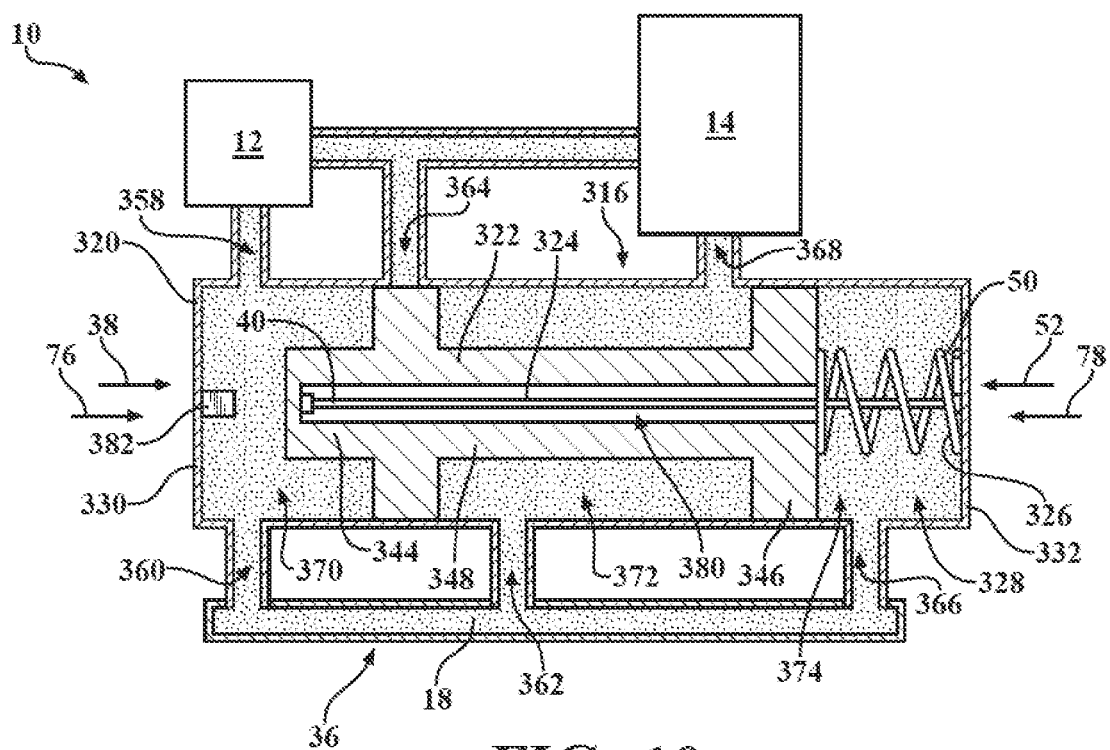
FIG. 10 is a schematic cross-sectional view of the valve of FIG. 9, shown in the second position.

Referring to the valve 316 shown in FIGS. 9 and 10, the actuator 324 is a wire that includes the SMA material 40. In this configuration, the spool 322 is disposed in the cavity 328 of the housing 320 and is movable longitudinally therein between the first position 34, shown in FIG. 9, and the second position 36, shown in FIG. 10. The wire is operatively disposed within the cavity 328 and is configured to act on the spool 322. The spool 322 includes a first section 344, a second section 346, and an intermediate section 348. The first section 344 is longitudinally spaced from the second section 346. The intermediate section 348 connects the first section 344 to the second section 346. The first section 344 and the second section 346 are radially sized to fit the cavity 328 such that the fluid 18 is prevented from passing within the cavity 328 between the first section 344 or the second section 346 and the housing 320. The intermediate section 348 is radially sized to be smaller than the first section 344 and second section 346 such that the fluid 18 is allowed to flow radially about the intermediate section 348, between the intermediate section 348 and the housing 320. The spool 322 defines a hole 380 extending through the second section 346, the intermediate section 348, and into the first section 344. More specifically, the hole 380 opens to, or otherwise faces, the second end 332 of the housing 320. The wire operatively extends within the hole 380 between the first section 344 and the second end 332 of the housing 320, opposite the first section 344. The wire is configured to act on the first section 344, from within the first section 344, and apply the first force 38 thereto. The biasing device 326 is operatively disposed in the cavity 328 between the second section 346, opposite the intermediate section 348, and the housing 320. The biasing device 326 may be a compression spring 50 and is configured to act on the second section 346 and apply the second force 52 to the spool 322, opposite the first force 38 applied by the wire.

A first end 330 of the housing 320 may include a spacer 382 that extends into the first portion 370 of the cavity 328. The spacer 382 is configured for limiting longitudinal movement of the spool 322 within the cavity 328 in the second longitudinal direction 78 by contacting the first section 344 of the spool 322 with the spacer 382.

The housing 320 defines the first inlet 358, the first outlet 360, the second inlet 362, the second outlet 364, the third inlet 366, and the third outlet 368 that are each in fluid communication with the cavity 328. The first inlet 358 provides fluid communication from the transmission to a first portion 370 of the cavity 328 that is defined between the first section 344 and the housing 320, opposite the intermediate section 348. The first outlet 360 provides fluid communication from the first portion 370 of the cavity 328 to each of the second inlet 362 and the third inlet 366. The second inlet 362 provides fluid communication from the first outlet 360 to a second portion 372 of the cavity 328 defined between the first section 344 and the second section 346. The third inlet 366 provides fluid communication from the first outlet 360 to a third portion 374 of the cavity 328 that is defined between the second section 346 and the housing 320, opposite the intermediate section 348. The second outlet 364 provides fluid communication from the second portion 372 of the cavity 328 to only the transmission 12 when the spool 322 is in the first position 34, as shown in FIG. 9. The third outlet 368 provides fluid communication from the second portion 372 of the cavity 328 to the fluid cooler 14 when the spool 322 is in the second position 36, as shown in FIG. 10. In the second position 36, once the fluid 18 passes through the fluid cooler 14, the fluid 18 then flows to the transmission. More specifically, when the spool 322 is in the first position 34, shown in FIG. 9, the second section 346 of the spool 322 blocks the third outlet 368, while leaving the second outlet 364 open to allow fluid communication from the second portion 372 of the cavity 328 to the transmission. Likewise, when the spool 322 is in the second position 36, shown in FIG. 10, the first section 344 of the spool 322 blocks the second outlet 364, while leaving the third outlet 368 open to allow fluid communication from the second portion 372 of the cavity 328 to the fluid cooler 14.

The wire is disposed in the first portion 370 of the cavity 328 and is also in fluid communication with the fluid 18 disposed in the first portion 370 of the cavity 328. When the fluid 18 is at a temperature that is a sufficient number of degrees less than the first temperature, the wire is deactivated. Likewise, when the fluid 18 is at a temperature that is greater than the first temperature, the wire is activated.

Referring specifically to FIG. 9, the fluid 18 is at a temperature that is a sufficient number of degrees less than the first temperature and the wire is deactivated such that the wire is longitudinally expanded. The expanded wire acts on the first section 344 of the spool 322 in the first longitudinal direction 76 with a first force 38 while the biasing device 326 acts on the second section 346 of the spool 322 in the second longitudinal direction 78 with a second force 52, which is greater than the first force 38 of the wire, to maintain the spool 322 in the first position 34. In the first position 34, the fluid 18 flows out of the first portion 370 of the cavity 328 through the first outlet 360 and into the second portion 372 of the cavity 328 through the second inlet 362 and the third portion 374 of the cavity 328 through the third inlet 366. The fluid 18 flows out of the second portion 372 of the cavity 328, through the second outlet 364, and back into the transmission. Therefore, in the first position 34, the fluid 18 is prevented from flowing from the cavity 328 into the fluid cooler 14.

Referring to FIG. 10, the fluid 18 is at a temperature that is at least equal to the first temperature and the wire is activated. Since the temperature of the fluid 18 is at least equal to the first temperature, the wire is activated and longitudinally contracts, increasing the magnitude of the first force 38 such that the first force 38 is greater than the second force 52 of the biasing device 326. The wire acts on the first section 344 of the spool 322 in the first longitudinal direction 76 with the first force 38 while the biasing device 326 acts on the second section 346 with the second force 52, which is less than the first force 38 of the wire, to move the spool 322 in the first longitudinal direction 76 and to maintain the spool 322 in the second position 36. Therefore, the first force 38 of the wire acting on the first section 344 of the spool 322 overcomes the second force 52 of the biasing device 326 acting on the second section 346 of the spool 322 to move the spool 322 in the first longitudinal direction 76 from the first position 34 to the second position 36. In the second position 36, the fluid 18 flows out of the first portion 370 of the cavity 328 through the first outlet 360 and back into the second portion 372 of the cavity 328 through the second inlet 362 and the third portion 374 of the cavity 328 through the third inlet 366. The fluid 18 flows out of the second portion 372 of the cavity 328 through the third outlet 368 and into the fluid cooler 14. The fluid 18 that flows through the fluid cooler 14 is cooled by the fluid cooler 14 and then flows from the fluid cooler 14, back into the transmission. When the spool 322 is in the second position 36, the first section 344 blocks the second outlet 364 such that the fluid 18 is prevented from flowing directly from the cavity 328 back into the transmission.

Figure 11:
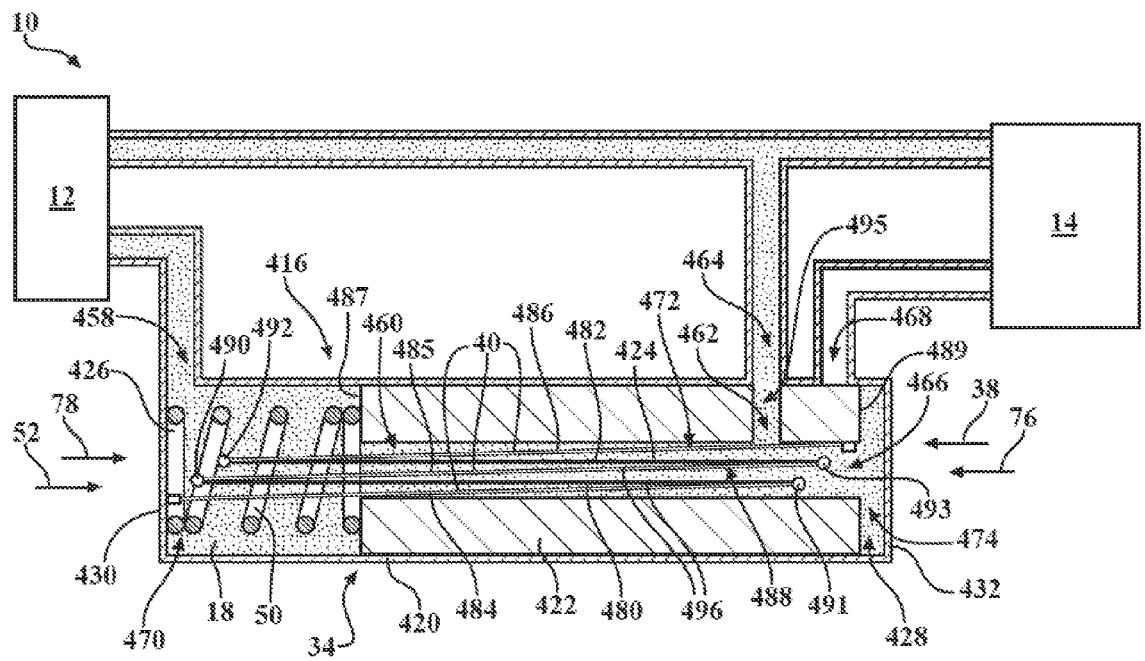
FIG. 11 is a schematic cross-sectional view of the fifth embodiment of the valve, shown in the first position.
Figure 12:
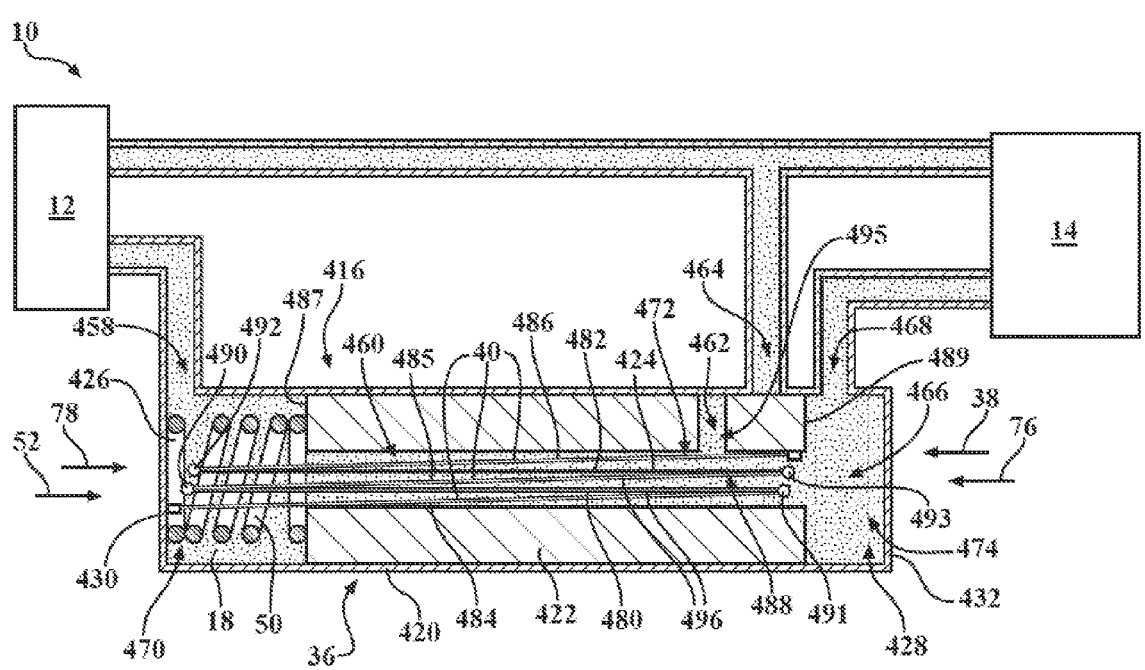
FIG. 12 is a schematic cross-sectional view of the valve of FIG. 11, shown in the second position.

Referring now to the valve 416 shown in FIGS. 11 and 12, the actuator 424 includes a primary member 480, a secondary member 482, and a first, second, and third wires 484, 485, 486. The first, second, and third wire 484, 485, 486 each include the SMA material 40. In this configuration, the spool 422 is disposed in the cavity 428 and is movable longitudinally therein between the first position 34, shown in FIG. 11, and the second position 36, shown in FIG. 12. The spool 422 extends between a first spool end 487 and a second spool end 489. The spool 422 defines a first channel 488 extending therethrough between the first spool end 489 and the second spool end 491. The spool 422 also defines a second channel 495 extending in generally perpendicular relationship to the first channel 488 such that the first channel 488 opens to, and is in fluid communication with, the second channel 495. The primary member 480, the secondary member 482, and the first, second, and third wires 484, 485, 486 are disposed in the cavity 428 and operatively extend through the first channel 488. The secondary member 482 extends in generally spaced and adjacent relationship to the primary member 480. The primary member 480 includes a first primary attachment location 490, proximate the first end 430 of the housing 420, and a second primary attachment location 491, spaced from the first primary attachment location 490, proximate the second end 432 of the housing 420. The secondary member 482 includes a first secondary attachment location 492, proximate the first end 430 of the housing 420, and a second secondary attachment location 493, spaced from the first secondary attachment location 492, proximate the second end 432 of the housing 420. The primary member 480 and the secondary member 482 are formed from a rigid material 496 that has a lower linear rate of expansion than each of the first, second, and third wires 484, 485, 486. More specifically, the primary member 480 and the secondary member 482 are formed from a rigid material 496 that has a negligible rate of expansion or contraction with respect to temperature. By way of a non-limiting example, the primary member 480 and the secondary member 482 are formed from material that is steel.

The first wire 484 operatively interconnects the primary member 480, at the second primary attachment location 491, and the first end 430 of the housing 420. The second wire 485 operatively interconnects the primary member 480, at the first primary attachment location 490, and the secondary member 482, at the second secondary attachment location 493. The third wire 486 operatively interconnects the secondary member 482, at the first secondary attachment location 492, and the spool 422, proximate the second end 432 of the housing 420. Therefore, the primary member 480 and the secondary member 482 are only attached to the housing 420 or the spool 422 via the respective first and third wires 484, 486. The primary and secondary member 480, 482 and are restrained by the respective first, second, and third wires 484, 485, 486. The first, second, and third wire 484, 485, 486 are formed from the SMA material 40 and are each configured to contract when the temperature is at least equal to the first temperature. When the first, second, and third wires 484, 485, 486 contract, the third wire 486 acts on the spool 422, proximate the second end 432 of the housing 420, and applies the first force 38 thereto. The first force 38 applied to the spool 422 is based on the contraction of each of the first, second, and third wires 484, 485, 486. The biasing device 426 is operatively disposed in the cavity 428 between the spool 422 and the first end 430 of the housing 420. The biasing device 426 may be a compression spring 50 and is configured to act on the spool 422 to apply a second force 52 to the spool 422, opposite the first force 38 applied by the first, second, and third wires 484, 485, 486.

The housing 420 defines the first inlet 458, the second outlet 464, and the third outlet 468 that are each in fluid communication with the cavity 428. The spool 422 defines the first outlet 460, the second inlet 462, and the third inlet 466 that are each in fluid communication with each of the cavity 428 and the first channel 488. The first inlet 458 provides fluid communication from the transmission to the first portion 470 of the cavity 428 that is defined between the spool 422 and the first end 430 of the housing 420. The first outlet 460 provides fluid communication from the first portion 470 of the cavity 428 through the first channel 488 to each of the second inlet 462 and the third inlet 466. The second inlet 462 provides fluid communication from the first outlet 460 to the second outlet 464 when the spool 422 is in the first position 34, as shown in FIG. 11. The third inlet 466 provides fluid communication from the first outlet 460 to the third portion 474 of the cavity 428 that is defined between the spool 422 and the second end 432 of the housing 420. The third outlet 468 provides fluid communication from the third portion 474 of the housing 420 to the fluid cooler 14 when the spool 422 is in the third position, as shown in FIG. 12. In the second position 36, once the fluid 18 passes through the fluid cooler 14, the fluid 18 then flows to the transmission. When the spool 422 is in the first position 34, shown in FIG. 11, the spool 422 blocks the third outlet 468, while leaving the second outlet 464 open to allow fluid communication from the first portion 470 of the cavity 428, through the first channel 488, to the transmission 12. Likewise, when the spool 422 is in the second position 36, shown in FIG. 12, the spool 422 blocks the second outlet 464, while leaving the third outlet 468 open to allow fluid communication from the first portion 470 of the cavity 428, through the first channel 488, to the fluid cooler 14.

The first, second, and third wires 484, 485, 486 are disposed in the cavity 428 and the first channel 488 and are also in fluid communication with the fluid 18 disposed in the cavity 428 and the first channel 488. When the fluid 18 is at a temperature that is a sufficient number of degrees less than the first temperature, the first, second, and third wires 484, 485, 486 are deactivated. Likewise, when the fluid 18 is at a temperature that is greater than the first temperature, the first, second, and third wires 484, 485, 486 are activated.

Referring specifically to FIG. 11, the fluid 18 is at a temperature that is a sufficient number of degrees less than the first temperature and the first, second, and third wires 484, 485, 486 are deactivated such that each of the first, second, and third wires 484, 485, 486 are longitudinally extended. The extended first, second, and third wires 484, 485, 486 act on the spool 422 in the first longitudinal direction 76 with a first force 38 while the biasing device 426 acts on the spool 422 in the second longitudinal direction 78 with a second force 52, which is greater than the first force 38 of the first, second, and third wires 484, 485, 486, to maintain the spool 422 in the first position 34. In the first position 34, the fluid 18 flows out of the first portion 470 of the cavity 428 through the first outlet 460 and into the second portion 472 of the cavity 428 through the second inlet 462 and the third portion 474 of the cavity 428 through the third inlet 466. The fluid 18 flows out of the second portion 472 of the cavity 428, through the second outlet 464, and back into the transmission. Therefore, in the first position 34, the fluid 18 is prevented from flowing from the cavity 428 and into the fluid cooler 14. Additionally, the first, second, and third wires 484, 485, 486, including the SMA material 40, are totally immersed in the flowing fluid 18 such that the temperature is uniform across all of the first, second, and third wires 484, 485, 486 and the temperature across the first, second, and third wires 484, 485, 486 matches the temperature of the fluid in the cavity 428. The hollow spool 422 is configured to use a smaller number of inlets and channels than described in the other embodiments.

Referring to FIG. 12, the fluid 18 is at a temperature that is at least equal to the first temperature and the first, second, and third wires 484, 485, 486 are activated. Since the temperature of the fluid 18 is at least equal to the first temperature, the first, second, and third wires 484, 485, 486 are activated and each longitudinally contract, increasing the magnitude of the first force 38 such that the first force 38 is greater than the second force 52 of the biasing device 426. The first, second, and third wires 484, 485, 486 act on the spool 422 in the first longitudinal direction 76 with the first force 38 while the biasing device 426 acts on the spool 422 with the second force 52, which is less than the first force 38 of the first, second, and third wires 484, 485, 486, to move the spool 422 in the first longitudinal direction 76 and to maintain the spool 422 in the second position 36. Therefore, the first force 38 of the first, second, and third wires 484, 485, 486 acting on the spool 422 overcomes the second force 52 of the biasing device 426 acting on the spool 422 to move the spool 422 in the first longitudinal direction 76 from the first position 34 to the second position 36. In the second position 36, the fluid 18 flows out of the first portion 470 of the cavity 428 through the first outlet 460 and back into the second portion 472 of the cavity 428 through the second inlet 462 and the third portion 474 of the cavity 428 through the third inlet 466. The fluid 18 flows out of the second portion 472 of the cavity 428 through the third outlet 468 and into the fluid cooler 14. The fluid 18 that flows through the fluid cooler 14 is cooled by the fluid cooler 14 and then flows from the fluid cooler 14, back into the transmission. When the spool 422 is in the second position 36, the spool 422 blocks the second outlet 464 such that the fluid 18 is prevented from flowing directly from the cavity 428 back into the transmission.

Figure 13:
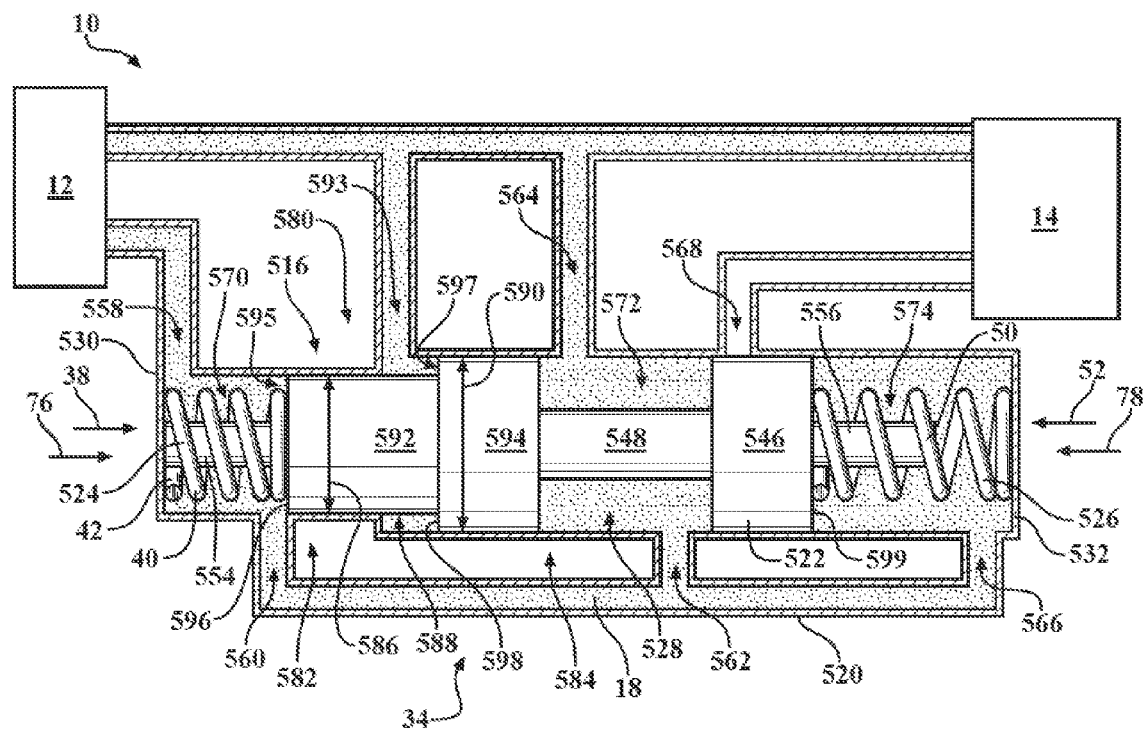
FIG. 13 is a schematic cross-sectional view of the sixth embodiment of the valve, shown in the first position.
Figure 14:
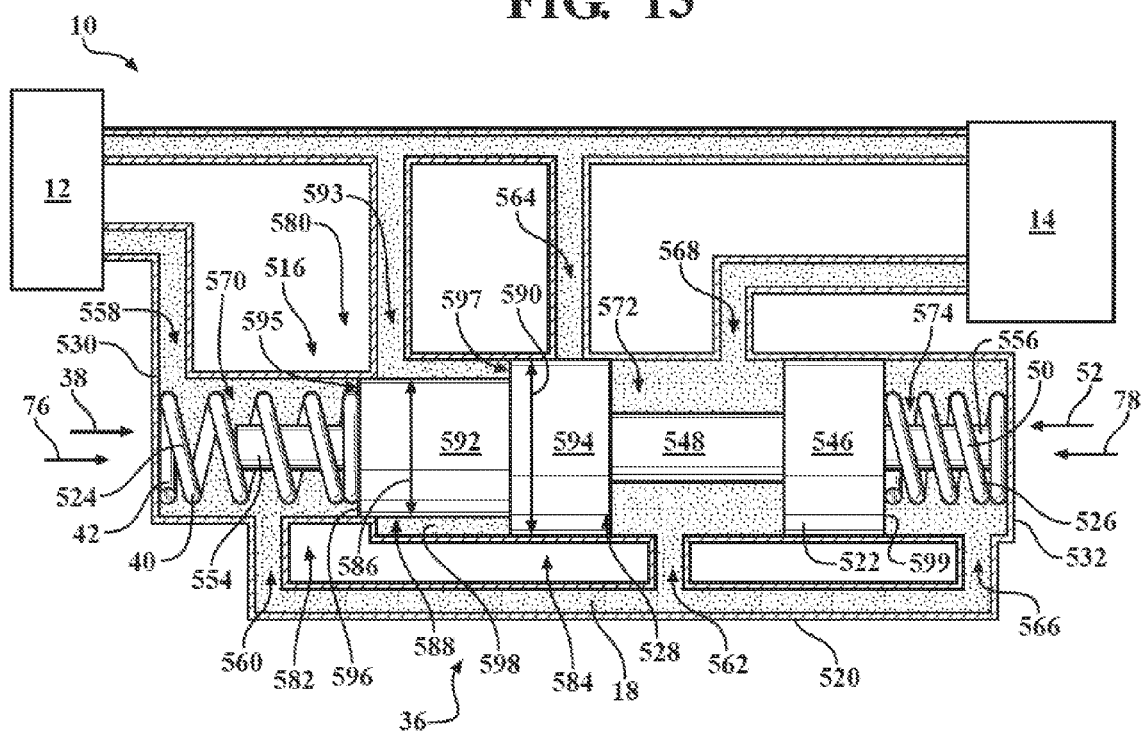
FIG. 14 is a schematic cross-sectional view of the valve of FIG. 13, shown in the second position.

Referring now to the valve 516 shown in FIGS. 13 and 14, the actuator 524 is a coil spring 42 that includes the SMA material 40. The valve 516 also includes a pressure relief 580 if there is a blockage of flow between the fluid cooler 14 and the transmission, as explained in more detail below. The spool 522 is disposed in the cavity 528 and is movable longitudinally therein between the first position 34, shown in FIG. 13, and the second position 36, shown in FIG. 14. The coil spring 42 is operatively disposed within the cavity 528 and is configured to act on the spool 522. The housing 520 includes a first sector 582 and a second sector 584, longitudinally adjacent the first sector 582. The first sector 582 of the housing 520 defines the first portion 570 of the cavity 528, where the first portion 570 of the cavity 528 has a first diameter 586. The second sector 584 of the housing 520 defines the second portion 572 of the cavity 528, the third portion 574 of the cavity 528, and a fourth portion 588 of the cavity 528, where the second portion 572 of the cavity 528, the third portion 574 of the cavity 528, and the fourth portion 588 of the cavity 528 each have a second diameter 590, greater than the first diameter 586.

The spool 522 includes a first leading section 592, a first trailing section 594, a second section 546, and an intermediate section 548. The first leading section 592 is spaced from the first end 530 of the housing 520. The first trailing section 594 is longitudinally disposed adjacent the first leading section 592 and is longitudinally spaced from the second section 546. The intermediate section 548 connects the first trailing section 594 to the second section 546. The first leading section 592 is disposed in the first portion 570 of the cavity 528 and in a fourth portion 588 of the cavity 528 within the second sector 584.

The first leading section 592 is radially sized to fit in the first portion 570 of the cavity 528 such that the fluid 18 is prevented from passing within the cavity 528 between the first portion 570 of the cavity 528 and the fourth portion 588 of the cavity 528. The first leading section 592 includes a leading face 595, opposing the first end 530 of the housing 520. The leading face 595 of the first leading section 592 presents a leading area 596.

The first trailing section 594 is disposed in the second portion 572 of the cavity 528. The first trailing section 594 is radially sized to fit in the second portion 572 of the cavity 528 such that the fluid 18 is prevented from passing within the cavity 528 between the first trailing section 594 and the housing 520. The first trailing section 594 radially extends beyond the first leading section 592. Therefore, the first trailing section 594 includes a trailing face 597, e.g., a ledge, which extends radially beyond the first leading section 592. The trailing face 597, a portion of the first leading section 592, and the housing 520 define the fourth portion 588 of the cavity 528. The trailing face 597 presents a trailing area 598.

The second section 546 includes a second face, opposing the second end 532 of the housing 520. The second face of the second section 546 presents a second area 599. The intermediate section 548 is radially sized to be smaller than the first section 544 and second section 546 such that the fluid 18 is allowed to flow radially about the intermediate section 548, between the intermediate section 548 and the housing 520.

The coil spring 42 is operatively disposed in the cavity 528 between the first leading section 592, opposite the intermediate section 548, and the housing 520. The coil spring 42 is configured to act on the first leading section 592 and apply the first force 38 to the leading face 595. The biasing device 526 is operatively disposed in the cavity 528 between the second section 546, opposite the intermediate section 548, and the housing 520. The biasing device 526 may be a compression spring 50 and is configured to act on the second section 546 and apply a second force 52 to the second face of the second section 546 of the spool 522, opposite the first force 38 applied by the coil spring 42.

The first leading section 592 may include a first nose 554 that extends longitudinally, opposite the intermediate section 548. The first nose 554 is configured for limiting longitudinal movement of the spool 522 within the cavity 528 in the second longitudinal direction 78 by contacting with the first end 530 of the housing 520. The coil spring 42 is coiled about the first nose 554 such that the first nose 554 is longitudinally restrained between the first leading section 592 and the housing 520. The second section 546 may also include a second nose 556 that extends longitudinally from the second section 546, opposite the intermediate section 548. The second nose 556 is configured for limiting longitudinal movement of the spool 522 within the cavity 528 in the first longitudinal direction 76 by contacting the second end 532 of the housing 520. The compression spring 50 is coiled about the second nose 556 such that the second nose 556 is longitudinally restrained between the second section 546 and the housing 520.

The housing 520 defines the first inlet 558, the first outlet 560, the second inlet 562, the second outlet 564, the third inlet 566, the third outlet 568, and a fourth inlet 593 that are each in fluid communication with the cavity 528. The first inlet 558 provides fluid communication from the transmission to the first portion 570 of the cavity 528 that is defined between the first leading section 592 and the housing 520, opposite the first leading section 592. The first outlet 560 provides fluid communication from the first portion 570 of the cavity 528 to each of the second inlet 562 and the third inlet 566. The second inlet 562 provides fluid communication from the first outlet 560 to the second portion 572 of the cavity 528 defined between the first trailing section 594 and the second section 546. The third inlet 566 provides fluid communication from the first outlet 560 to the third portion 574 of the cavity 528 that is defined between the second section 546 and the housing 520, opposite the intermediate section 548. The second outlet 564 provides fluid communication from the second portion 572 of the cavity 528 to the transmission and the fourth inlet 593, which opens to the fourth portion 588 of the cavity 528, when the spool 522 is in the first position 34, as shown in FIG. 13. The third outlet 568 provides fluid communication from the second portion 572 of the cavity 528 to the fluid cooler 14 when the spool 522 is in the second position 36, as shown in FIG. 14. In the second position 36, once the fluid 18 passes through the fluid cooler 14, the fluid 18 then flows to the transmission and the fourth portion 588 of the cavity 528. When the spool 522 is in the first position 34, shown in FIG. 13, the second section 546 of the spool 522 blocks the third outlet 568, while leaving the second outlet 564 open to allow fluid communication from the second portion 572 of the cavity 528 to the transmission and the fourth portion 588 of the cavity 528. Likewise, when the spool 522 is in the second position 36, shown in FIG. 14, the first trailing section 594 of the spool 522 blocks the second outlet 564, while leaving the third outlet 568 open to allow fluid communication from the second portion 572 of the cavity 528 to the fluid cooler 14.

The coil spring 42 is disposed in the first portion 570 of the cavity 528 and is also in fluid communication with the fluid 18 disposed in the first portion 570 of the cavity 528. When the fluid 18 is at a temperature that is a sufficient number of degrees less than the first temperature, the coil spring 42 is deactivated. Likewise, when the fluid 18 is at a temperature that is greater than the first temperature, the coil spring 42 is activated.

Referring specifically to FIG. 13, the fluid 18 is at a temperature that is a sufficient number of degrees less than the first temperature and the coil spring 42 is deactivated such that the coil spring 42 is longitudinally contracted. The contracted coil spring 42 acts on the first leading section 592 of the spool 522 in the first longitudinal direction 76. Additionally, the fluid 18 in the first portion 570 of the cavity 528 acts in the first longitudinal direction 76 on the leading area 596 of the first leading section 592 with a first pressure and the fluid 18 in the fourth portion 588 of the cavity 528 acts on the trailing area 598 of the first trailing section 594 with a fourth pressure. The biasing device 526 acts on the second section 546 of the spool 522 in the second longitudinal direction 78 with a second force 52. Additionally, the fluid 18 in the third portion 574 of the cavity 528 acts in the second longitudinal direction 78, opposite the first longitudinal direction 76, with a third pressure. The fluid 18 in the second portion 572 of the cavity 528 has a zero net force on the spool 522 since the first trailing section 594 has the same diameter as that of the second section 546. The combination of the second force 52, acting on the second section 546, and the force resulting from the third pressure acting on the second area 599 of the second section 546 is greater than the combination of the first force 38, acting on the first leading section 592, and the force resulting force resulting from the first pressure acting on the leading face 595 and the fourth pressure acting on the trailing face 597 to maintain the spool 522 in the first position 34. By way of a non-limiting example, when the fluid 18 is at a temperature that is a sufficient number of degrees less than the first temperature, and the coil spring 42 is deactivated, the coil spring 42 acts on the first leading section 592 with a first force 38 of 10 Newton meters (N), while the biasing device 526 acts on the second section 546 with a second force 52 of approximately 25 N. In the first position 34, the fluid 18 flows out of the first portion 570 of the cavity 528 through the first outlet 560 and into the second portion 572 of the cavity 528 through the second inlet 562 and the third portion 574 of the cavity 528 through the third inlet 566. The fluid 18 flows out of the second portion 572 of the cavity 528, through the second outlet 564, and back into the transmission and into the fourth portion 588 of the cavity 528. Therefore, in the first position 34, the fluid 18 is prevented from flowing from the cavity 528 and into the fluid cooler 14.

Referring to FIG. 14, the fluid 18 is at a temperature that is at least equal to the first temperature and the coil spring 42 is activated. Since the temperature of the fluid 18 is at least equal to the first temperature, the coil spring 42 is activated and longitudinally expands, increasing the magnitude of the first force 38 such that the first force 38 is greater than the second force 52 of the biasing device 526. Additionally, the fluid 18 in the first portion 570 of the cavity 528 acts in the first longitudinal direction 76 on the leading area 596 of the first leading section 592 with the first pressure and the fluid 18 in the fourth portion 588 of the cavity 528 acts on the trailing area 598 of the first trailing section 594 with the fourth pressure. The biasing device 526 acts on the second section 546 of the spool 522 in the second longitudinal direction 78 with a second force 52. Additionally, the fluid 18 in the third portion 574 of the cavity 528 acts in the second longitudinal direction 78, opposite the first longitudinal direction 76, with the third pressure. The combination of the second force 52, acting on the second section 546, and the force resulting from the third pressure acting on the second area 599 of the second section 546 is less than the combination of the first force 38, acting on the first leading section 592, the force resulting from the first pressure acting on the leading face 595, and the force resulting from the fourth pressure acting on the trailing face 597 to move the spool 522 in the first longitudinal direction 76 from the first position 34 to the second position 36. The fourth pressure is determined by the fluid 18 being exhausted from the fluid cooler 14. By way of a non-limiting example, when the fluid 18 is at a temperature that is at least equal to the first temperature, and the coil spring 42 is activated, the coil spring 42 expands and acts on the first leading section 592 with a first force 38 of generally between 50 N and 60 N, to move the spool 522 and compress the biasing device 526. The biasing device 526 acts on the second section 546 with a second force 52 of approximately 32 N. In the second position 36, the fluid 18 flows out of the first portion 570 of the cavity 528 through the first outlet 560 and back into the second portion 572 of the cavity 528 through the second inlet 562 and the third portion 574 of the cavity 528 through the third inlet 566. The fluid 18 flows out of the second portion 572 of the cavity 528 through the third outlet 568 and into the fluid cooler 14. The fluid 18 that flows through the fluid cooler 14 is cooled by the fluid cooler 14 and then flows from the fluid cooler 14, back into the transmission. When the spool 522 is in the second position 36, the first section 544 blocks the second outlet 564 such that the fluid 18 is prevented from flowing directly from the cavity 528 back into the transmission.

Additionally, referring again to FIG. 14, when the valve 516 is in the second position 36, the fourth portion 588 of the cavity 528 provides pressure relief 580 to the transmission fluid circuit 10 if there is blockage in the transmission fluid circuit 10. If there is a pressure build up, the valve 516 will move from the second position 36 to the first position 34 (FIG. 13), regardless of the temperature of the fluid 18. More specifically, when the valve 516 is in the second position 36, and the fourth pressure of the fluid 18 acting on the trailing face 597 of the first trailing section 594 becomes too low, i.e., the pressure falls below a minimum threshold, this indicates that there is a blockage in the transmission fluid circuit 10, and the valve 516 is moved to the first position 34, overcoming the activated coil spring 42 acting on the first leading section 592, to bypass the fluid cooler 14. When the combination of the second force 52, acting on the second section 546, and the force resulting from the third pressure acting on the second area 599 of the second section 546 becomes greater than the combination of the first force 38, acting on the first leading section 592, the force resulting from the first pressure acting on the leading face 595, and the force resulting from the fourth pressure acting on the trailing face 597 to move the spool 522 in the second longitudinal direction 78 from the second position 36 to the first position 34. When there is a blockage within the valve 516, the second and third pressures will be the same as, or slightly lower than, the first pressure.

While the best modes for carrying out the invention have been described in detail, those familiar with the art to which this invention relates will recognize various alternative designs and embodiments for practicing the invention within the scope of the appended claims.

The invention claimed is:

1. A transmission fluid circuit comprising:
   a transmission configured for receiving and expelling a fluid;
   a cooler configured for receiving and expelling the fluid to the transmission;
   a valve configured for directing the flow of fluid received from the transmission to one of the transmission and the fluid cooler, the valve including:
      a housing defining a cavity extending longitudinally between a first end and a second end, wherein the cavity is configured for receiving and expelling the fluid;
      a spool disposed in the cavity and movable longitudinally therein between a first position and a second position;
      an actuator operatively disposed within the cavity and configured to act on the spool;
      wherein the actuator is in fluid communication with the fluid and includes a smart material configured to be activated in response to the temperature of the fluid in the cavity having at least a first temperature such that activation of the smart material activates the actuator;
      wherein the smart material is configured to be deactivated in response to the fluid in the cavity having a sufficient number of degrees less than the first temperature such that the smart material deactivates the actuator;
      wherein the actuator acts on the spool when activated to move the spool from the first position to the second position;
      wherein the fluid is only permitted to flow from the cavity to the cooler, the cooler to the transmission, and from the transmission to the cavity when the spool is in the second position;
      wherein the spool moves from the second position to the first position when the actuator is deactivated; and
      wherein the fluid is only permitted to flow from the cavity to the transmission and from the transmission to the cavity when the spool is in the first position.

2. A transmission fluid circuit, as set forth in claim 1, wherein the valve further includes a biasing device disposed in the cavity, wherein the biasing device continuously reacts against the spool to move the spool to the first position when the actuator is deactivated;
   wherein the biasing device continuously reacts against the spool in a first longitudinal direction;
   wherein the actuator acts on the spool in a second longitudinal direction, opposite the first longitudinal direction, when activated, such that the actuator acts on the spool to overcome the biasing device and move the spool from the first position to the second position; and
   wherein the biasing device acts on the spool in the first direction to move the spool in the first direction from the second position to the first position when the actuator is deactivated.

3. A transmission fluid circuit, as set forth in claim 2, wherein the spool includes a first section and a second section;
   wherein the actuator acts on the first section of the spool; and
   wherein the biasing device reacts against the second section of the spool.

4. A transmission fluid circuit, as set forth in claim 3, wherein the spool further includes an intermediate section longitudinally disposed between the first section and the second section;
   wherein the first section and the second section are radially sized to fit within the cavity such that fluid is prevented from passing within the cavity between each of the first section and the second section and the housing; and wherein the intermediate section is radially sized to be smaller than the first second and the second section such that the fluid is allowed to flow radially about the intermediate section and the housing, between the first section and the second section.

5. A transmission fluid circuit, as set forth in claim 4, wherein the first section of the spool has a first leading section and a second leading section;
   wherein the first leading section is spaced from the first end of the housing;
   wherein the first trailing section is longitudinally disposed between the first leading section and the intermediate section such that the intermediate section interconnects the first trailing section and the second section; and
   wherein the first trailing section is radially sized to be larger than the first leading section.

6. A transmission fluid circuit, as set forth in claim 5, wherein when the valve is in the second position and the flow from the fluid cooler is below a minimum threshold, the biasing device acts on the spool in the first direction to move the spool in the first direction from the second position to the first position to overcome the actuator when activated.

7. A transmission fluid circuit, as set forth in claim 1, wherein the smart material longitudinally contracts when the actuator is activated.

8. A transmission fluid circuit, as set forth in claim 1, wherein the smart material longitudinally expands when the actuator is activated.

9. A transmission fluid circuit, as set forth in claim 1, wherein the actuator is a coil spring.

10. A transmission fluid circuit, as set forth in claim 1, wherein the actuator is a membrane having a dome shape.

11. A transmission fluid circuit, as set forth in claim 1, wherein the actuator includes at least one wire.

12. A transmission fluid circuit, as set forth in claim 11, wherein the at least one wire extends between a first wire end and a second wire end;
   wherein the at least one wire is operatively attached to the housing at one of the first wire end and the second wire end such that the first wire end and the second wire end are in spaced relationship to one another; and
   wherein the spool is operatively attached to the at least one wire between the first wire end and the second wire end.

13. A transmission fluid circuit, as set forth in claim 1, wherein the spool extends longitudinally between a first spool end and a second spool end;
   wherein the spool defines a first channel extending therethrough between the first spool end and a second spool end;
   wherein the spool defines a second channel extending in generally perpendicular relationship to the first channel such that the first channel is in fluid communication with the second channel;
   wherein the spool is radially sized to fit within the cavity such that fluid is prevented from passing within the cavity between the spool and the housing;
   wherein the fluid is only permitted to flow from the cavity, via the first and second channels, to the cooler, the cooler to the transmission, and from the transmission to the cavity when the spool is in the second position; and
   wherein the fluid is only permitted to flow from the cavity, via the first and second channels, to the transmission and from the transmission to the cavity when the spool is in the first position.

14. A transmission fluid circuit, as set forth in claim 1, wherein the actuator includes:
   a primary member longitudinally disposed in the cavity;
   a secondary member longitudinally disposed in the cavity in spaced and adjacent relationship to the first member;
   wherein the primary member includes a first primary attachment location and a second primary attachment location spaced from the first primary attachment location and disposed proximate the second end of the housing;
   wherein the secondary member includes a first secondary attachment location and a second secondary attachment location spaced from the first secondary attachment location and disposed proximate the first end of the housing;
   a first wire, a second wire, and a third wire;
   wherein the first wire operatively extends between the first end of the housing and the first primary attachment location of the primary member;
   wherein the second wire operatively extends between the first primary attachment location of the primary member and the second secondary attachment location second attachment location of the secondary member;
   wherein the third wire is fixedly connected to the first secondary attachment location of the secondary member and the spool, proximate the second end of the housing; and
   wherein each of the first, second, and third wires include the smart material.

15. A transmission fluid circuit, as set forth in claim 1, wherein the actuator is operatively connected to the spool.

16. A transmission fluid circuit, as set forth in claim 1, wherein the actuator is operatively connected to the housing.

17. A transmission fluid circuit, as set forth in claim 1, further comprising a spacer operatively disposed in the cavity between the spool and the housing.

18. A transmission fluid circuit, as set forth in claim 1, wherein the smart material is entirely immersed in the fluid such that the temperature of the entire smart material is equal to the temperature of the fluid within the cavity.

19. A transmission fluid circuit comprising:
   a transmission configured for receiving and expelling a fluid;
   a cooler configured for receiving and expelling the fluid to the transmission;
   a valve configured for directing the flow of fluid received from the transmission to one of the transmission and the fluid cooler, the valve including:
      a housing defining a cavity extending longitudinally between a first end and a second end, wherein the cavity is configured for receiving and expelling the fluid;
      wherein the housing includes a first inlet, a second outlet, and a third outlet in fluid communication with the cavity;
      a spool disposed in the cavity and movable longitudinally therein between a first position and a second position;
      wherein the first inlet provides fluid communication from the transmission to a first portion of the cavity that is defined between the spool and the first end of the housing;
      an actuator operatively disposed within the cavity and configured to act on the spool;
      wherein the actuator is in fluid communication with the fluid and includes a smart material configured to be activated in response to the fluid in the cavity having at least a first temperature such that activation of the smart material activates the actuator;

wherein the smart material is configured to be deactivated in response to the fluid in the cavity having less than the first temperature such the smart material deactivates the actuator;

wherein the actuator acts on the spool when activated to move the spool from the first position to the second position;

wherein the fluid is only permitted to flow through the third outlet from the cavity to the cooler, the cooler to the transmission, and from the transmission to the cavity through the first inlet when the spool is in the second position;

a biasing device disposed in the cavity, wherein the biasing device continuously reacts against the spool to move the spool to the first position when the actuator is deactivated; and wherein the fluid is only permitted to flow through the second outlet from the cavity to the transmission and from the transmission to the cavity through the first inlet when the spool is in the first position.

* * * * *

UNITED STATES PATENT AND TRADEMARK OFFICE
CERTIFICATE OF CORRECTION

PATENT NO. : 8,960,562 B2  
APPLICATION NO. : 13/213138  
DATED : February 24, 2015  
INVENTOR(S) : Neelakantan et al.

Page 1 of 1

It is certified that error appears in the above-identified patent and that said Letters Patent is hereby corrected as shown below:

Title Page, Item (75) Inventor is corrected to read:
-- Vijay A. Neelakantan, Rochester Hills (MI);
Paul G. Otanez, Troy (MI);
Shushan Bai, Ann Arbor (MI);
Nilesh D. Mankame, Ann Arbor (MI);
Xiujie Gao, Troy (MI);
Nancy L. Johnson, Northville (MI);
Patrick B. Usoro, Troy (MI);
Alan L. Browne, Grosse Pointe (MI) --.

Signed and Sealed this
Twenty-fourth Day of November, 2015

Michelle K. Lee
*Director of the United States Patent and Trademark Office*